US008745488B1

(12) United States Patent
Wong

(10) Patent No.: US 8,745,488 B1
(45) Date of Patent: Jun. 3, 2014

(54) SYSTEM AND A METHOD FOR WEB-BASED EDITING OF DOCUMENTS ONLINE WITH AN EDITING INTERFACE AND CONCURRENT DISPLAY TO WEBPAGES AND PRINT DOCUMENTS

(76) Inventor: Patrick Wong, Brookings, OR (US)

( * ) Notice: Subject to any disclaimer, the term of this patent is extended or adjusted under 35 U.S.C. 154(b) by 231 days.

(21) Appl. No.: 13/170,538

(22) Filed: Jun. 28, 2011

Related U.S. Application Data

(60) Provisional application No. 61/360,298, filed on Jun. 30, 2010.

(51) Int. Cl.
*G06F 17/00* (2006.01)
*G06F 17/24* (2006.01)
*G06F 17/21* (2006.01)

(52) U.S. Cl.
CPC .............. *G06F 17/24* (2013.01); *G06F 17/243* (2013.01); *G06F 17/211* (2013.01)
USPC ........... 715/255; 715/221; 715/223; 715/224; 715/271

(58) Field of Classification Search
USPC .................. 715/234, 221–226, 255, 271–272
See application file for complete search history.

(56) References Cited

U.S. PATENT DOCUMENTS

| | | | |
|---|---|---|---|
| 5,899,502 A | | 5/1999 | Del Giorno |
| 6,088,700 A * | | 7/2000 | Larsen et al. .......................... 1/1 |
| 6,871,325 B1 | | 3/2005 | McNally et al. |
| 7,000,184 B2 * | | 2/2006 | Matveyenko et al. ........ 715/235 |
| 7,272,628 B1 * | | 9/2007 | Pravetz et al. ................ 709/203 |
| 7,318,191 B2 * | | 1/2008 | Kunzel ............................. 715/226 |
| 7,620,682 B1 * | | 11/2009 | Pravetz et al. ................ 709/203 |
| 7,949,962 B1 * | | 5/2011 | Pham et al. .................... 715/851 |
| 8,059,290 B2 * | | 11/2011 | Kuroshima .................... 358/1.15 |
| 8,131,815 B1 * | | 3/2012 | Perelman et al. ............. 709/217 |
| 8,578,265 B2 * | | 11/2013 | Bajohr et al. ................. 715/235 |
| 2002/0194219 A1 * | | 12/2002 | Bradley et al. ................ 707/506 |
| 2003/0106021 A1 * | | 6/2003 | Mangrola ...................... 715/513 |

(Continued)

OTHER PUBLICATIONS

Adobe Systems Incorporated ; "FDF Toolkit Overview and Reference" Technical Note #5194 Version :Acrobat 6.0; Oct. 2003, p. 1-156.*

(Continued)

*Primary Examiner* — Laurie Ries
*Assistant Examiner* — Benjamin Smith
(74) *Attorney, Agent, or Firm* — Jerry Haynes Law

(57) ABSTRACT

A method and a system for editing documents online, that in some implementations, simultaneously edits a webpage document, in a webpage file format, and an image document, in an image file format. The webpage document and the image document may have substantially similar visual content. In some implementations, an editing interface is displayed to a client device. The editing interface may have a first portion displaying one or more webpage editing forms for editing the webpage document and a second portion displaying the webpage document or image document being edited. The editing interface accepts editing data from the client device. Both the webpage document and an image document may be updated based on accepted editing data. The image document is updated in part by updating form data retrieved from a database. In some implementations, the updated webpage document is displayed on a webpage and access to the image document is provided from the webpage.

17 Claims, 20 Drawing Sheets

(56) References Cited

U.S. PATENT DOCUMENTS

| | | | |
|---|---|---|---|
| 2004/0044578 A1 | 3/2004 | Kim et al. | |
| 2004/0069313 A1 | 4/2004 | DeLaquil | |
| 2004/0073866 A1* | 4/2004 | Kunzel | 715/500 |
| 2004/0153462 A1* | 8/2004 | Bardwell | 707/100 |
| 2004/0199543 A1* | 10/2004 | Braud et al. | 707/104.1 |
| 2005/0060234 A1* | 3/2005 | Reahard | 705/19 |
| 2006/0085265 A1 | 4/2006 | Dietz et al. | |
| 2006/0100896 A1 | 5/2006 | Lahey et al. | |
| 2006/0190489 A1* | 8/2006 | Vohariwatt et al. | 707/104.1 |
| 2007/0127064 A1* | 6/2007 | Kuroshima | 358/1.15 |
| 2008/0077641 A1* | 3/2008 | Lee et al. | 707/E17.009 |
| 2009/0026273 A1 | 1/2009 | Gelbman | |
| 2009/0157752 A1 | 6/2009 | Gonzalez | |

OTHER PUBLICATIONS

Planet PDF "How to populate a PDF file's form with data from a web server"; http://web.archive.org/web/20090504072923/http://www.planetpdf.com/developer/article.asp?ContentID=6492; p. 1-7.*

Justin Koivisto; "Using HTML forms to fill in PDF fields with PHP and FDF"; http://web.archive.org/web/20090628154723/http://koivi.com/fill-pdf-form-fields/index.; p. 1-11.*

Planet PDF "How to populate a PDF file's form with data from a web server"; http://web.archive.org/web/20090504072923/http://www.planetpdf.com/developer/article.asp?ContentID=6492; p. 1-7; 1999.*

Justin Koivisto; "Using HTML forms to fill in PDF fields with PHP and FDF"; http://web.archive.org/web/20090628154723/http://koivi.com/fill-pdf-form-fields/index.; p. 1-11; 2009.*

* cited by examiner

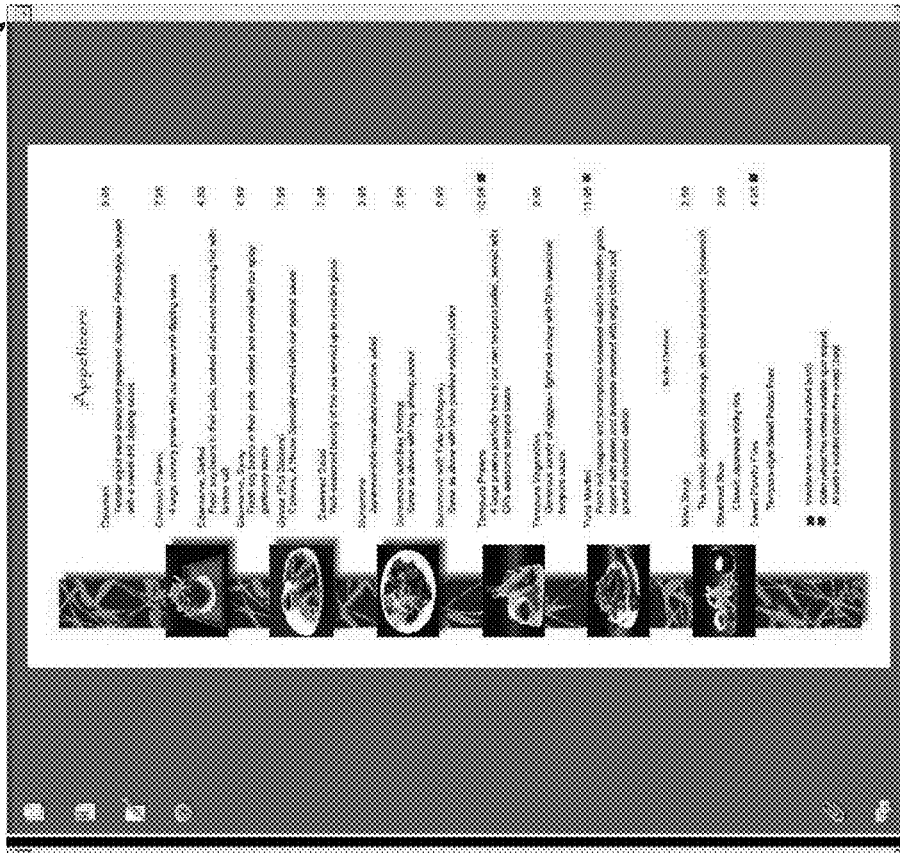
Figure 5B — Image Document - 555, Second Window - 554, 553B
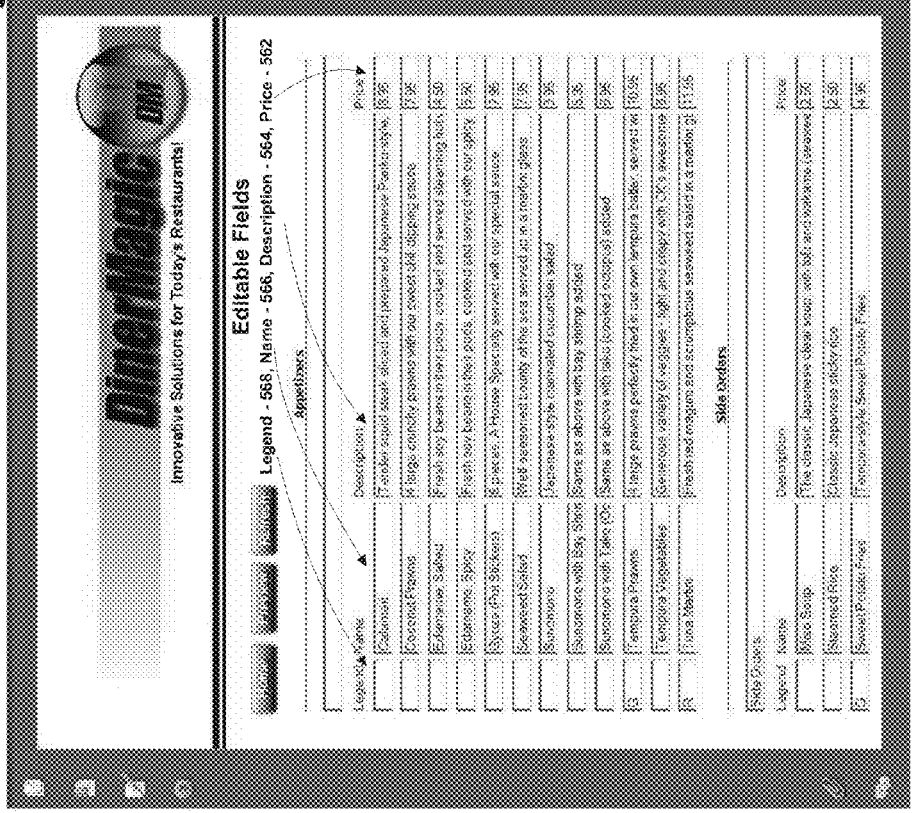
Figure 5A — Webpage Editing Form Document - 557, Editing Interface - 550, First Window - 552, 553A

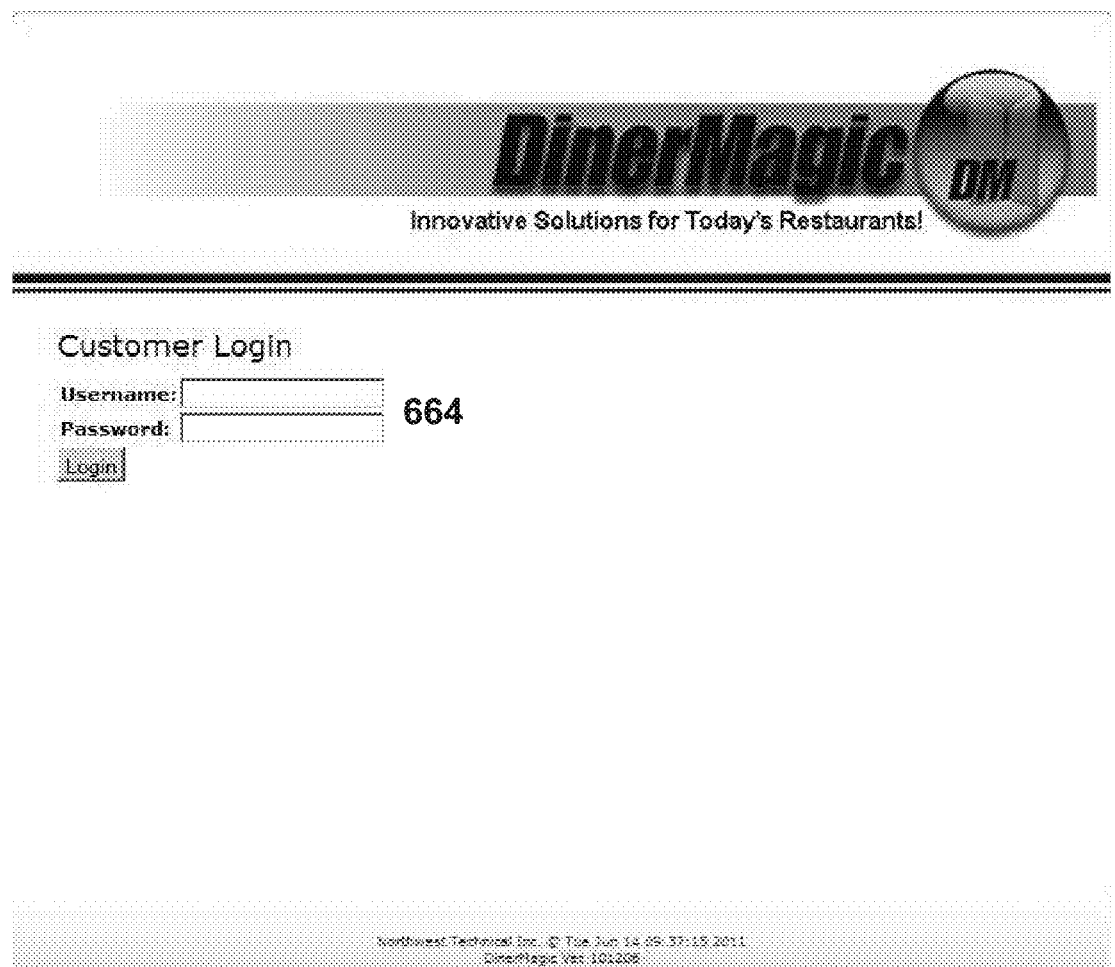

Figure 7   Administration Panel - 794

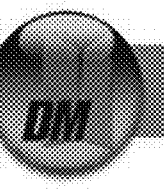

880 → HTML hyperlink to an image document, in this case a PDF version of the menu, viewable by a mouseclick (not shown).
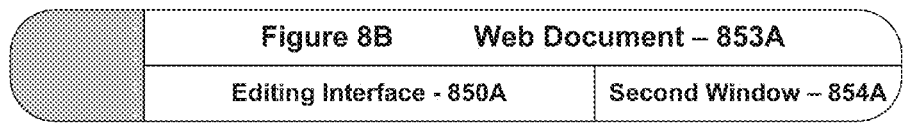
Figure 8B  Web Document – 853A
Editing Interface - 850A    Second Window – 854A

Editable Fields
Legend – 868B, Name – 866B, Price – 862B

Appetizers

| Legend | Name | Description | Price |
|---|---|---|---|
| G | Calamari - Gluten Free | Tender squid steak sliced and prepared Japanese Panko-style. | 8.95 |
|  | Coconut Prawns | 4 large crunchy prawns with our sweet chili dipping sauce | 8.95 |
|  | Edamame, Salted | Fresh soy beans in their pods, cooked and served steaming hot | 4.75 |
| s | Edamame, Spicy | Fresh soy beans in their pods, cooked and served with our spicy | 5.95 |
|  | Gyoza (Pot Stickers) | 6 pieces. A House Specialty served with our special sauce | 7.95 |
|  | Seaweed Salad | Well-seasoned bounty of the sea served up in a martini glass | 7.95 |
|  | Sunomono | Japanese-style marinated cucumber salad | 3.95 |
|  | Sunomono with Bay Shri | Same as above with bay shrimp added | 5.95 |
|  | Sunomono with Tako (O | Same as above with tako (cooked octopus) added | 6.95 |
| G | Tempura Prawns | 4 large prawns perfectly fried in our own tempura batter, served | 10.95 |
|  | Tempura Vegetables | Generous variety of veggies - light and crispy with CK's awesom | 8.95 |
| R | Tuna Martini | Fresh red maguro and scrumptious seaweed salad in a martini g | 11.95 |

876

| Figure 8C | Web Form Document – 857B |
|---|---|
| Editing Interface – 850B | First Window – 852B |

880 ▶ HTML hyperlink to an image document, in this case a PDF version of the menu, viewable by a mouseclick (not shown).
| Figure 8D | Webpage Document – 853B |
|---|---|
| Editing Interface – 850B | Second Window – 854B |

Edited Name - 866C

Edited Legend - 868C

Edited Prices - 862C

Appetizers

| | |
|---|---|
| Calamari - Gluten Free<br>Tender squid steak sliced and prepared Japanese Panko-style, served with a sweet chili dipping sauce | 9.95 ■ |
| Coconut Prawns<br>4 large crunchy prawns with our sweet chili dipping sauce | 8.95 |
| Edamame, Salted<br>Fresh soy beans in their pods, cooked and served steaming hot with kosher salt | 4.75 |
| Edamame, Spicy<br>Fresh soy beans in their pods, cooked and served with our spicy garlic-soy sauce | 5.95 ■ |
| Gyoza (Pot Stickers)<br>6 pieces, A House Specialty served with our special sauce | 7.95 |
| Seaweed Salad<br>Well-seasoned bounty of the sea served up in a martini glass | 7.95 |
| Sunomono<br>Japanese-style marinated cucumber salad | 3.95 |
| Sunomono with Bay Shrimp<br>Same as above with bay shrimp added | 5.95 |
| Sunomono with Tako (Octopus)<br>Same as above with tako (cooked octopus) added | 6.95 |
| Tempura Prawns<br>4 large prawns perfectly fried in our own tempura batter, served with CK's awesome tempura sauce | 10.95 ■ |
| Tempura Vegetables<br>Generous variety of veggies - light and crispy with CK's awesome tempura sauce | 8.95 |
| Tuna Martini<br>Fresh red maguro and scrumptious seaweed salad in a martini glass, topped with prawn and avocado crowned with bright tobiko and graceful shredded daikon | 11.95 ■ |

| Figure 8E | Image Document – 853C |
|---|---|
| Editing Interface – 850B | Second Window – 854C |

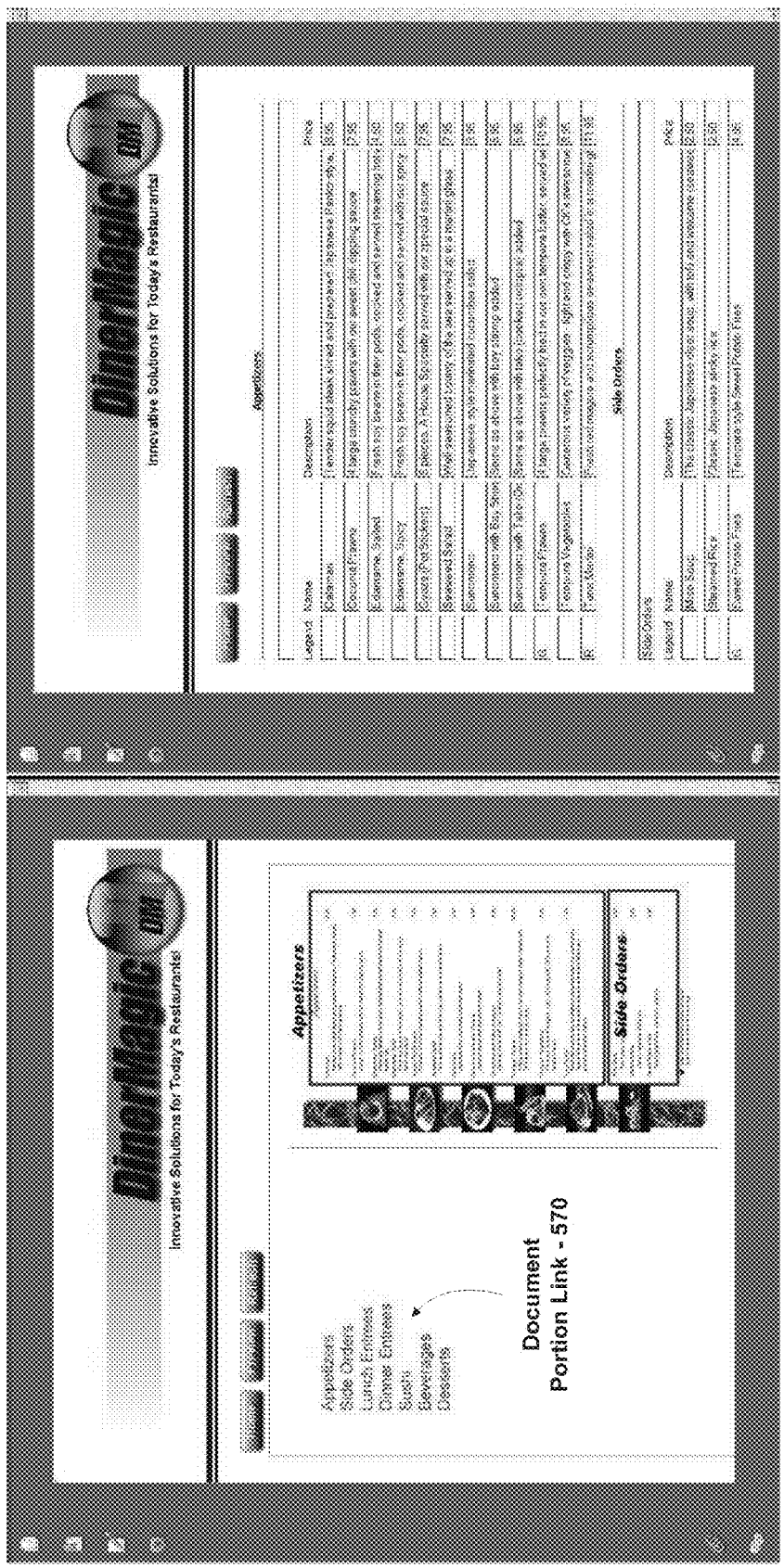

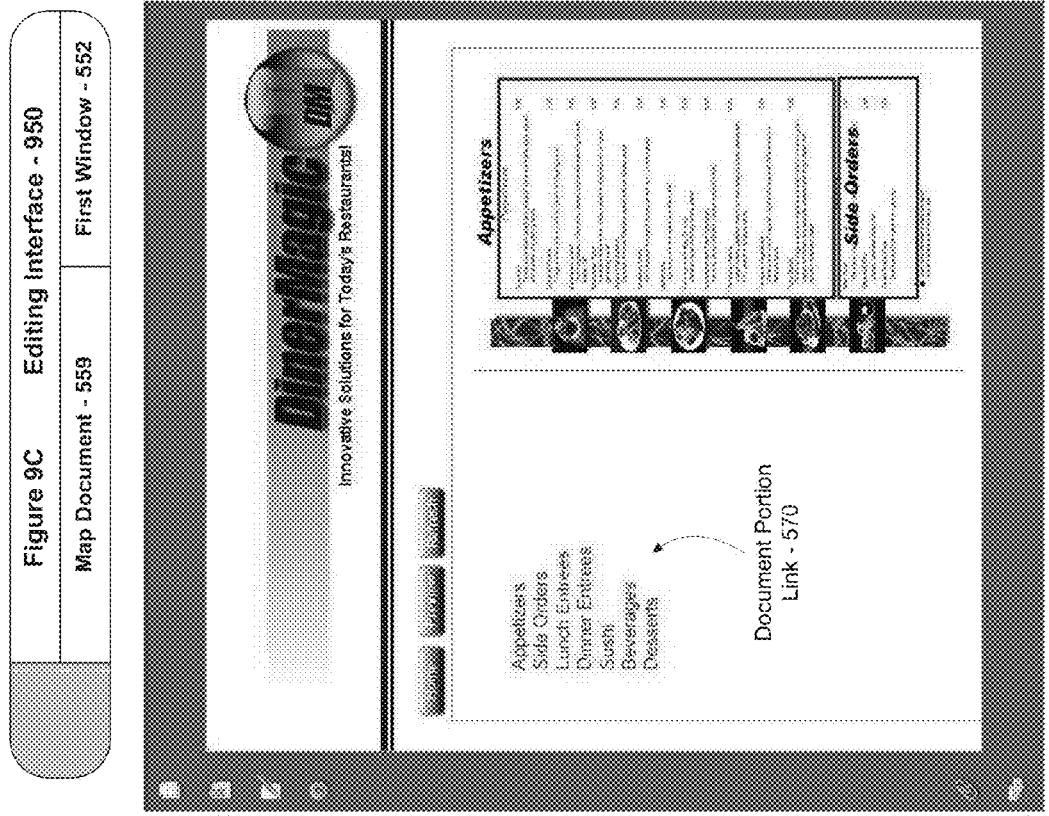

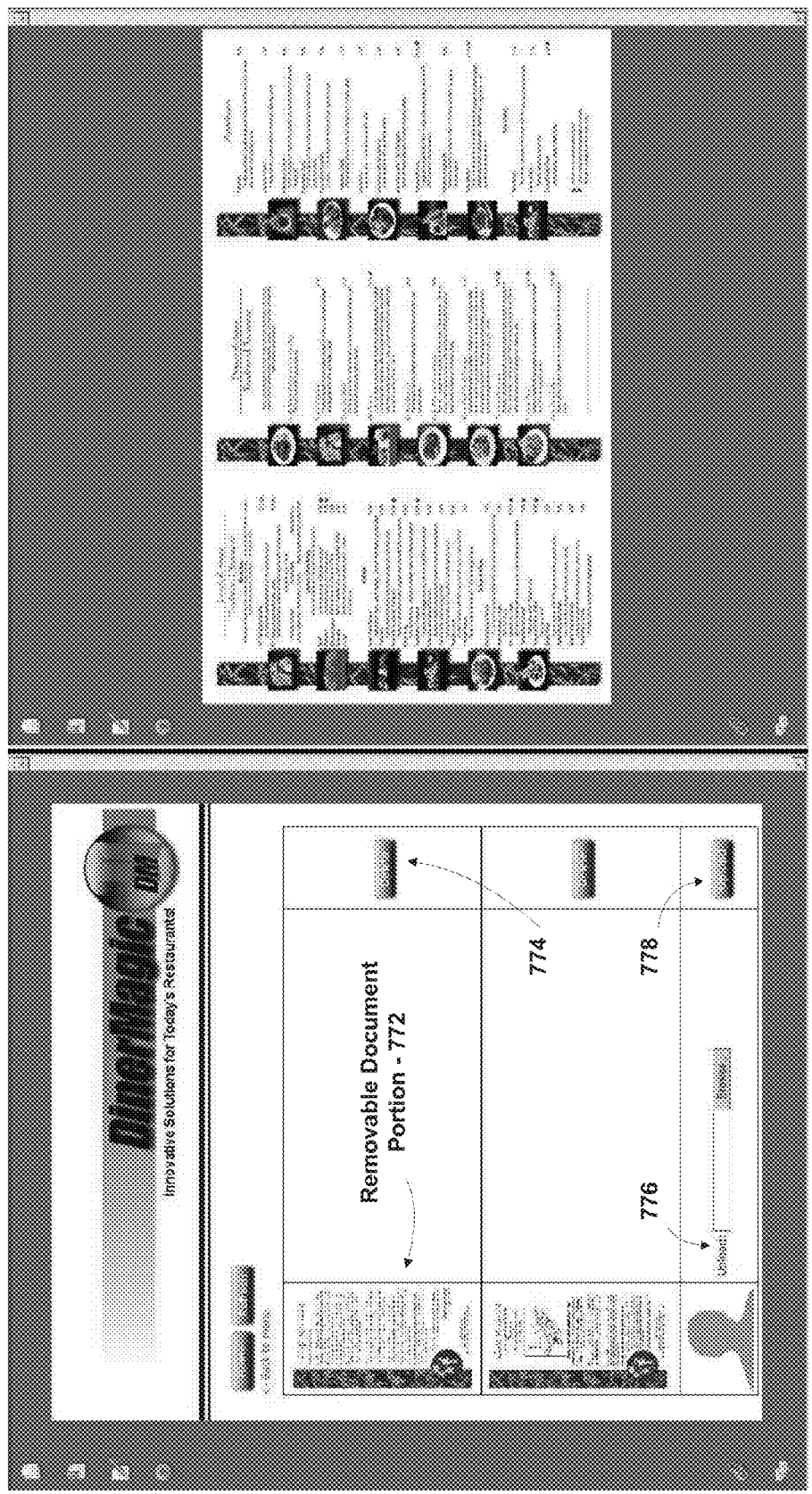

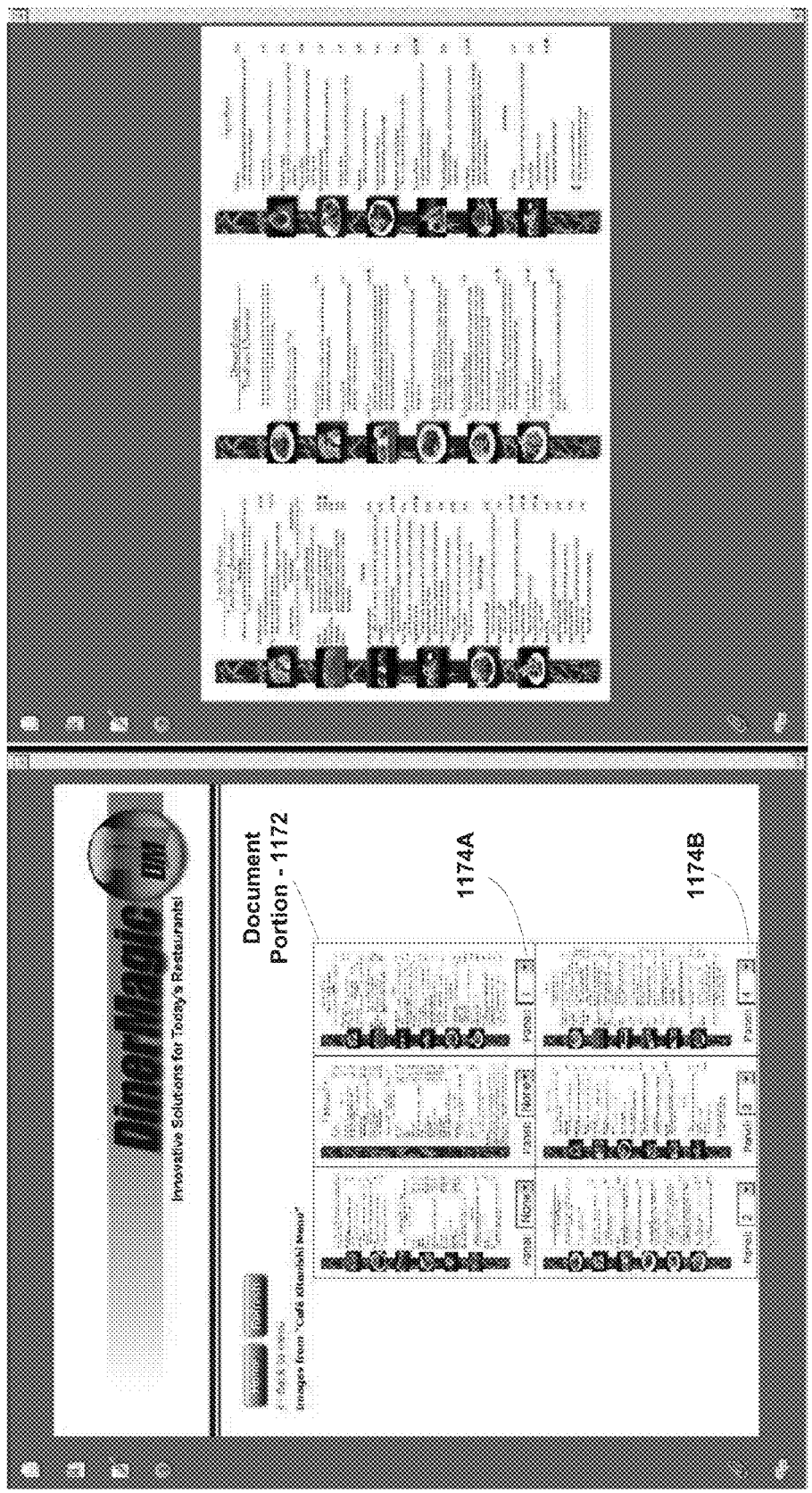

FIG. 12

1210 Computer-readable storage medium bearing program instructions

1220 Program instructions operable to cause a computing device to perform a process, the process comprising:

displaying an editing interface to a second client device, via a second network, the displayed editing interface including at least a first portion and a second portion, the first portion displaying at least one or more form documents for entering editing data for editing documents, or one or more document maps for navigating about the one or more form documents when performing editing, the second portion displaying the webpage document or an image document in an image file format, the editing interface accepting editing data, from the second client device;

updating the webpage document based on the accepted editing data;

accessing, from a database, form data that is in a data management file format, updating the form data based on the accepted editing data, populating a image form document with the updated form data, the image form document being in the image file format, and storing the updated form data in the database;

generating, with the populated image form document, an updated image document; and continuing to display the editing interface until an indication is received that the second client device has terminated the editing of the webpage document.

1222 Transmit updated webpage and image document to web server for display of webpage document on web page and for providing access to image document from web page 1224 Accept webpage document, image document, webpage form documents, document maps, and image form documents and generate form data from image form documents and store form data in database.

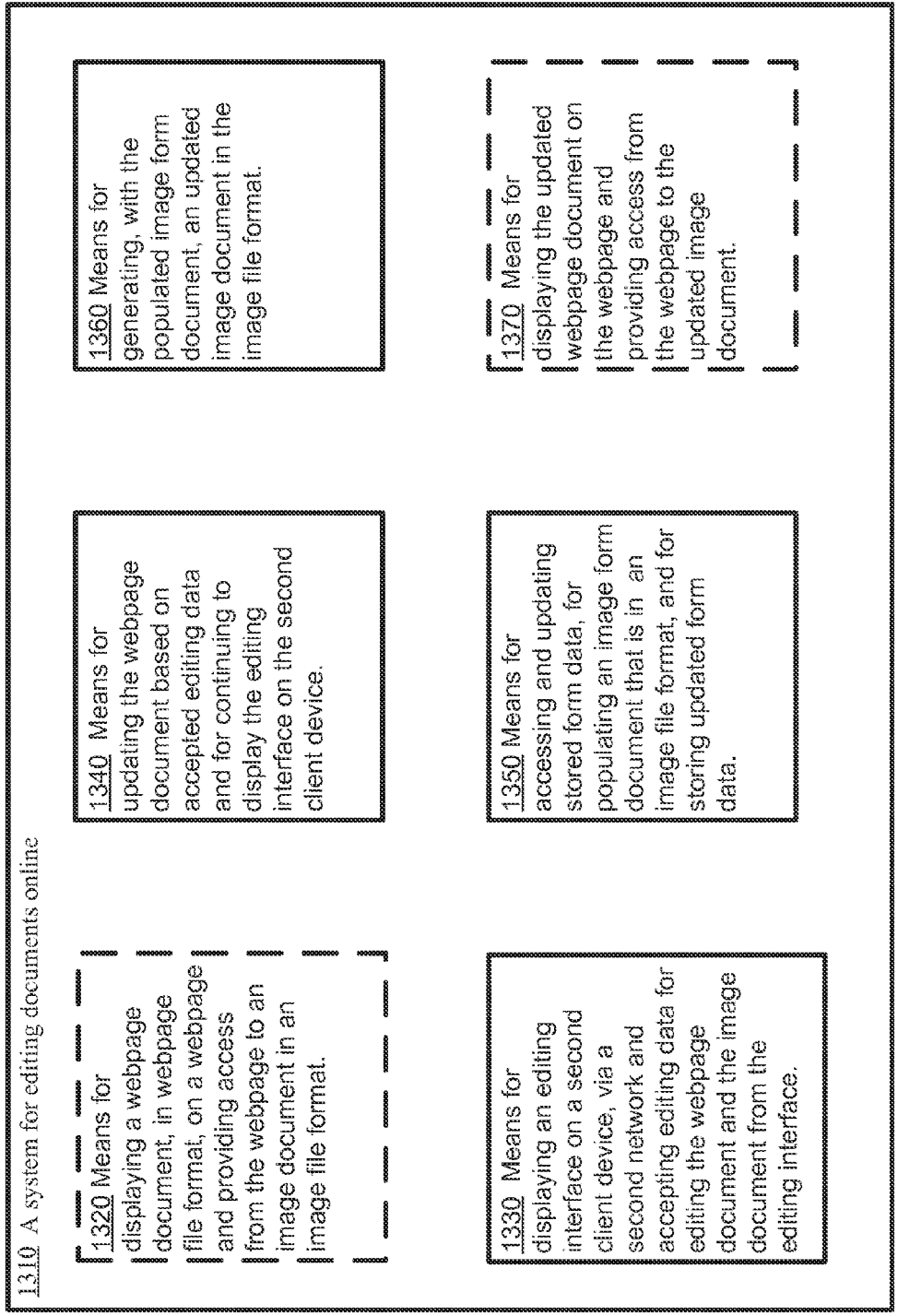

SYSTEM AND A METHOD FOR WEB-BASED EDITING OF DOCUMENTS ONLINE WITH AN EDITING INTERFACE AND CONCURRENT DISPLAY TO WEBPAGES AND PRINT DOCUMENTS

CROSS-REFERENCE TO RELATED PATENT APPLICATIONS

This application claims the benefit of U.S. Provisional Application Ser. No. 61/360,298, "WEB-BASED DIGITIZED PAGE EDITOR WITH SIMULTANEOUS DISPLAY TO WEBPAGES AND PRINT FILES" filed Jun. 30, 2010. The above provisional application, U.S. Provisional Application Ser. No. 61/360,298, is hereby incorporated by reference in its entirety.

FIELD

This invention relates to a system and a method of editing documents online with an editing interface. More specifically, this invention relates to a system and a method for editing both a webpage file version of a document and an image file version of the document online with an editing interface.

BACKGROUND

Sometimes a person, such as a business owner, wants to edit a document that exists only as a hard copy document. For example, a restaurant owner may want to edit a restaurant menu that has been printed on paper. In some cases, the restaurant owner may not have the restaurant menu in any electronic format. In other cases, the restaurant owner may have the restaurant menu in an electronic format, but only in an image format, such as PDF.

Further, once the restaurant owner finishes editing the menu, it may still be desirable to have the edited menu in an image format, such as PDF, for purposes of printing copies of the menu. In one case, the restaurant owner may have a printer, the desired type of paper and be capable of printing the menus onto the paper with the printer. In other cases, the restaurant owner may have the electronic file with the edited menu in a flash drive. The restaurant owner may then take the flash drive to a commercial printing business to have a desired number of menus printed on a selected type and size of paper.

Other types of businesses may have documents that exist only in hard copy or in an image file format. For example, an apartment owner may have a notice that is posted in common areas of apartment complexes. For example, there may be a notice that is posted at apartment swimming pools that needs to be updated. In another example, a grocery store owner may have a flyer with a list of specials that needs to be updated weekly.

A document may also exist in both a hard copy version and an online version that is viewable over the Internet. Returning to the example of the restaurant owner, there may be an online version of the menu for viewing over the Internet. There may also be a hard copy version of the menu that is distributed to customers in the restaurant. In some cases, both versions may be in an electronic format. For example, in some cases the online version of the menu may be in a webpage file format, such as HTML. In some cases the hard copy version of the menu may be also maintained electronically in an image file format, such as PDF. The restaurant owner may find it helpful to be able to go to a computer and edit both the online version of the menu and the image file version of the menu simultaneously.

In designing an editing program that allows a person to edit both a webpage file version of a document and an image file version of the document, there are various design considerations.

For example, one design consideration is the extent to which the editing program is available on a server that the person can access from a client computer. In that case, the person may save the time and expense of purchasing, installing, and maintaining the editing program.

Another possible design consideration is the extent to which the editing program on a server allows a person to edit the documents from their client computer using simple tools—such as a simple online editor. In that case, the person may be able to do the editing themselves and save the expense of hiring a professional to edit or update the documents.

Another design consideration is the extent to which an editing program allows editing of both a webpage file version of a document and an image file version of the document to be performed substantially simultaneously or concurrently.

SUMMARY

In some embodiments, a method includes displaying an editing interface to a client device via a network. The displayed editing interface may include at least a first portion and a second portion. The first portion may display one or more webpage form documents for performing editing. In addition, or instead, the first portion may display one or more map documents for navigating about the one or more webpage form documents when editing. The second portion displays the webpage document or an image document in an image file format. The editing interface accepts editing data, from the client device, for editing the webpage document and the image document.

In some embodiments, the editing interface continues to be displayed until an indication is received that the client device has terminated the editing of the webpage document.

In some embodiments, the method further includes accessing, from a database, form data that is in a data management file format. The form data may be updated based on the accepted editing data. The form data may be used to populate an image form document that is in an image file format. The updated form data may be stored in the database.

In some embodiments, the method further includes generating, with the populated image form document, an updated image document, the updated image document being in the image file format.

Other embodiments include a system for editing a document online with an editing interface. Other embodiments include a computer-readable storage media bearing computer-executable instructions that when executed cause the computer to execute a process.

The above summary of some embodiments is provided for the convenience of the reader and is not intended to be limiting in any way.

DESCRIPTION OF THE DRAWINGS

Certain embodiments of the invention may be understood by reference to the following detailed description read with reference to the accompanying drawings.

FIGS. 5A and 5B are screenshots of an editing interface in accordance with some embodiments, showing a first window with a webpage form document and a second window with an image document.

FIG. 6 is a screenshot of a login screen in accordance with some embodiments.

FIG. 7 is screenshot of an administrative panel as seen in a client device in accordance with some embodiments, showing a list of available selections.

FIG. 8A is a screenshot of first portion of an editing interface in accordance with some embodiments, showing a webpage form document for entering editing data, the webpage form document not reflecting any edits.

FIG. 8B is a screenshot of a second portion of the editing interface of FIG. 8A in accordance with some embodiments, showing a webpage document, the webpage document not reflecting any edits.

FIG. 8C is a screenshot of the first portion of FIG. 8A in accordance with some embodiments, showing the webpage form document of FIG. 8A, now reflecting some edits.

FIG. 8D is a screenshot of the second portion of FIG. 8B in accordance with some embodiments, showing the webpage document of FIG. 8B, now reflecting some edits.

FIG. 8E is a screen shot of the second portion of FIG. 8B in accordance with some embodiments, showing the automatic and substantially simultaneous or concurrent updating and display of the same edited changes in both webpage documents.

FIGS. 9A-9D are screenshots of an editing interface as seen in a client device in accordance with some embodiments, showing a map document in a first window and a webpage form document in a second window.

FIGS. 10A and 10B are screenshots of another editing interface in accordance with some embodiments, showing, in a first window, miniature images or document portions of a multiple-page document that allows parts of at least one or more images (pages) of the document to be deleted, and in a second window, the resulting selected pages reformatted into a single, combined, reduced-size image document.

FIGS. 11A and 11B are screenshots of an editing interface in accordance with some embodiments, showing, in a first window, an Editing form that allows parts of at least one or more images (pages) of the document to be reordered, and in a second window, the resulting selected pages reformatted into a single, combined, reduced-size image document.

FIG. 12 is a block diagram of a computer readable storage medium bearing program instructions in accordance with some embodiments.

FIG. 13 is a block diagram of a system showing a plurality of means in accordance with some embodiments.

DETAILED DESCRIPTION

Figure 1:
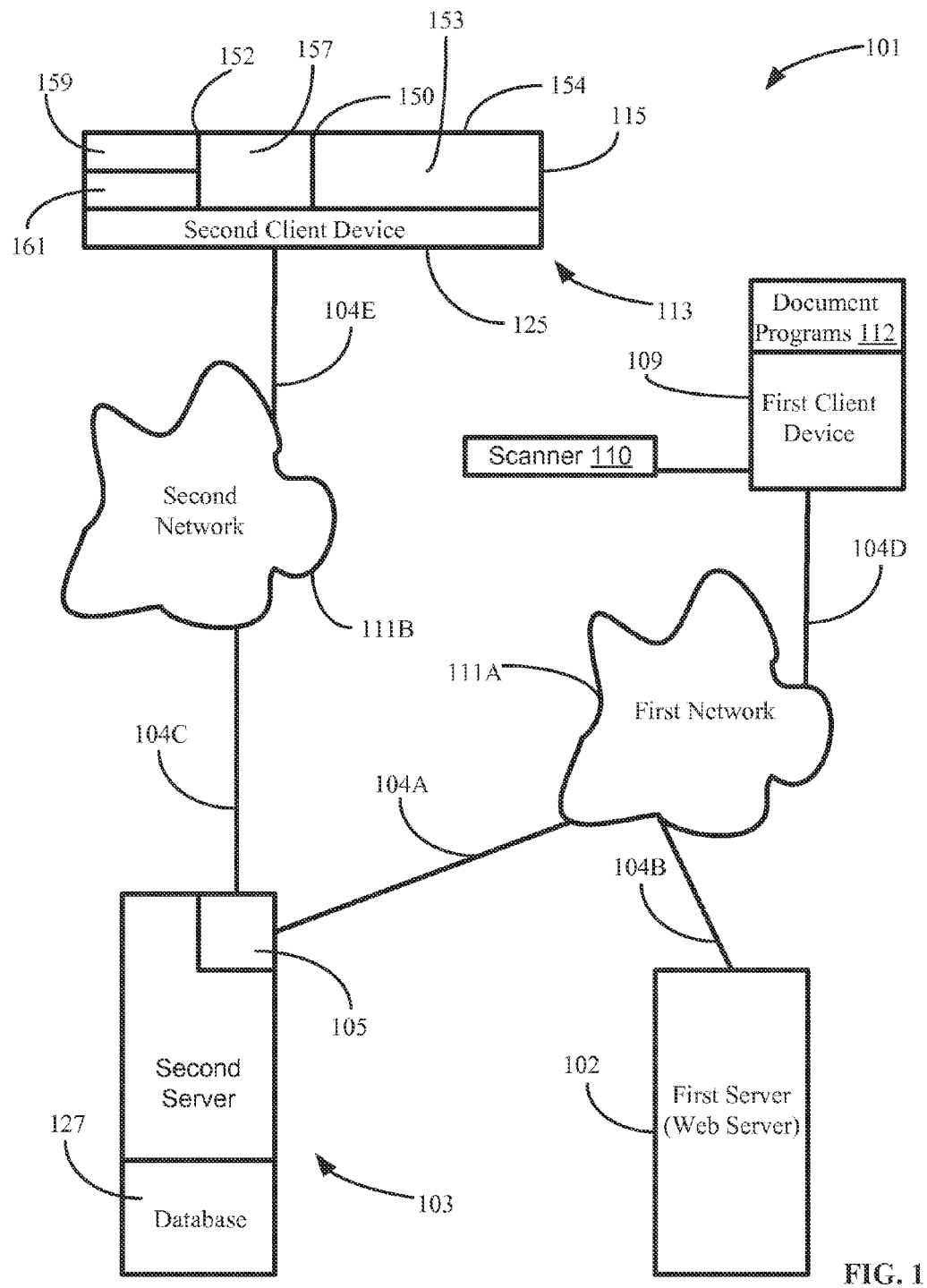
FIG. 1 is a block diagram of a system and network environment in which some embodiments may be implemented.

Some embodiments include a system and a method that allow a remote user of a client device to edit both a webpage file version of a printed document and an image file version of the printed document using a simple online editor, accessible through a website. In some embodiments, the webpage file version of the printed document is viewable on a website of the remote user. An image file version of the printed document is available for download and printing from the website of the remote user. In some further embodiments, when the remote user edits the webpage file version of the document with the online editor, both the webpage file version and the image file version of the document are updated. In some embodiments, the updated online version of the document is available for viewing on the website of the remote user. In addition, the updated image file version of the document is available for download and printing from the website of the remote user.

In this application, when discussing an online version of the document, reference is made to a "webpage document." The webpage document is in a webpage file format. A webpage file format includes all file types that may be used to create and maintain documents for display on a webpage on a website. In general, a webpage file format allows for editing of text in the webpage document. Without limitation, in some embodiments, the term webpage file format include at least one or more of HTML (Hyper Text Markup Language), XHTML, JavaScript, Perl, PHP, CSS (Cascading Style Sheets), Ruby, Python, Cold Fusion, ASP (Active Server Pages) or FLASH.

Also, in this application, reference is made to an "image document." An image document is in an image file format. An image file format includes all file types in which text in the document at least appears to be an image. Without limitation, in some embodiments, these image file formats include at least one or more of PDF (Portable Document Format), TIFF (Tagged Image File Format), JPEG (Joint Photographic Experts Group), BMP (Bitmap Image File), PNG (Portable Network Graphics), XPS (XML Page Specification), EPUB (Electronic Publication), GIF, or DjVU.

Some embodiments discussed herein may be used to edit and manage documents in the restaurant industry. For example, a webpage document may be an online version of a printed menu, the online menu being in a webpage file format. Further, an image document may be an image file type version of the same printed menu. That is, the viewable content of the webpage document and the image document may be the same, or at least substantially similar.

Some embodiments discussed herein may be used in many applications and markets besides the restaurant industry. Some embodiments may be used in any industry or market where simple online editing is desired. Some embodiments may be used in any industry or market where a person has both an online version of a printed document (a "webpage document") and an image file version of the printed document (an "image document"). Potential users include websites that offer real estate lots or used cars for sale. Any market that traditionally uses brochures or other print advertising, whether or not in conjunction with a website, may use one or more embodiments.

In this application, multiple references may be made to "some embodiments." These multiple references to "some embodiment" may or may not be referring to the same set of embodiments.

Further, in this application and in the claims there may be multiple references to various "circuitries." These various circuitries may or may not be referring to the same or to different circuitries. Some of the various circuitries may be the same circuitry or different circuitries and other of the various circuitries may overlap with other circuitries.

In this application and in the claims there may be multiple references to various "means for." These various "means for"

may or may not be referring to the same or to different "means for." Some of the various "means for" may be the same "means for" and other of the various "means for" may be referring to the same or to different "means for."

In this application, reference may be made to a "network," for example, to "a first network," or to "a second network." In these words and phrases, network has its ordinary meaning. In particular a network may include two or more networks. That is, the word network may be used in the singular (i.e., a single network) or in the plural (i.e. at least two, three or more networks). Whether used in the singular or the plural, the word "network" may refer to two or more communicably connected, but different types of networks. For example, both a local area network and the Internet, if they are communicably coupled, may jointly be referred to as a "network." Further, as used herein, a network may, without limitation, include a local area network, an intranet, a medium area network, a wide area network, the Internet, a cellular network, a satellite network, a wireless network, a wired network, a home network, a company network, or to any other type of network known by those skilled in the art.

Further, in this application, communication "via a network" includes at least communication via one or more of a router, core router, modem, network interface, network server, cable, optical fiber, backbone, or via any other machine, device, satellite, infrastructure, or portion thereof, by which communications are routed into or through one or more networks. Those skilled in the art know that communication via a network includes communication via one or more of the above or additional network infrastructure.

Referencing FIG. 1, some embodiments may be practiced in an exemplar system 101 that includes a second server 103 that includes a database 127. In some embodiments, database 127 is a relational database. In some embodiments, database 127 is an object-oriented database. In some embodiments, database 127 is another type of database known to those of ordinary skill in the art. Although FIG. 1 shows database 127 maintained on the second server 103, in other embodiments, database 127 is maintained on a separate database server (not shown).

Further referencing FIG. 1, in some embodiments, system 101 includes a first server 102, such as a Web Server for publishing, hosting, or maintaining websites and their web pages. In some embodiments, first server 102 is in communication with second server 103. For example, second server 103 has a network interface 105 that is communicably coupled via network route 104A with first network 111A, which is communicably coupled via network route 104B with first server 102—through a network interface (not shown) of first server 102. In some embodiments, first network 111A is at least one of the Internet, an intranet, a local area network, or any combination of the above. In some embodiments, first network 111A may include a wireless router (not shown) or a satellite link (not shown).

Further referencing FIG. 1, in some embodiments, system 101 includes a first client device 109 and a second client device 113. In some embodiments, the first client device and the second client device may be the same device. The first and second client devices 109, 113 may be any of numerous types of computing devices. Although they may be personal desktop computers, either or both of the client devices may be a laptop computer, a server, a tablet PC, a smartphone, a game console, a thin client, or any of numerous types of devices capable of computing.

In some embodiments, the first client device 109 is communicably coupled with first server 102 and second server 103 via first network 111A and network routes 104A, 104B, and 104D. In some embodiments, the second client device 113 is communicably coupled with the second server 103 via a second network 111B and network routes 104C and 104E.

In some embodiments, the second network 111B is the same as or includes first network 111A or vice versa. In some embodiments, the first network 111A includes the Internet and the second network 111B includes an intranet. In some embodiments, the first network 111A includes an intranet and the second network 111B includes the Internet. In addition, network routes 104A-104E are just examples of some of the possible routes. For example, in some embodiments, first client device 109 may access second server via the second network 111B via a route (not shown) between first client device 109 and second network 111B and route 104C. In some embodiments, network routes may exist between the first client device 109 and the second client device 113. Indeed, an indirect route is shown in FIG. 1 via routes 104D, 104A, 104C, and 104E. As known to those of ordinary skill in the art, network routes may be flexible and variable.

In some embodiments, system 101 includes first client device 109 being communicably coupled with a scanner 110. In some embodiments, scanner 110 is configured for scanning hard copy documents or images to create documents that are electronic copies of the scanned documents of images. In some embodiments, scanner 110 is configured to create the electronic copies as image documents in an image file format. In some embodiments, scanner 110 is configured to communicate the created image documents to first client device 109.

In some embodiments, system 101 includes first client device 109 having stored in non-volatile memory (not shown) thereof, document programs 112. In some embodiments, first client device 109 is configured to execute the document programs 112 for performing operations on a variety of document types. In some embodiments, these operations include at least one of creating a new document or editing an existing document, such as an existing document communicated to first client device 109 from scanner 110. In some embodiments document programs 112 includes at least one of Adobe Acrobat or Adobe InDesign.

In some embodiments, system 101 includes second client device 113 comprising a chassis 125 and a display 115, the display showing an editing interface 150, to be discussed in more detail below.

Figure 1A:
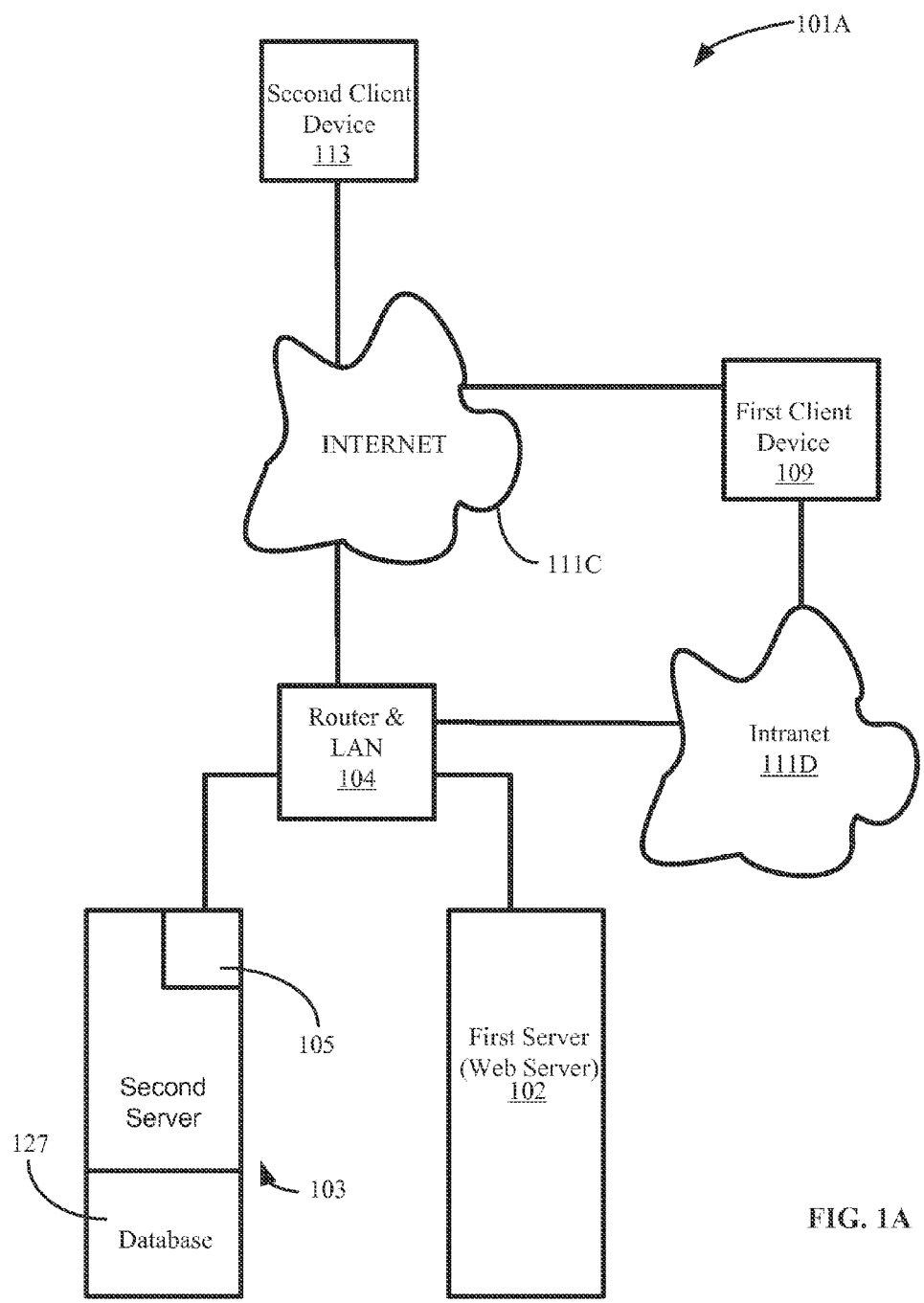
FIG. 1A is a block diagram of a system and network environment in which some embodiments may be implemented.

Moving forward with reference to FIG. 1A, in some embodiments, system 101 includes second server 103, with database 127 and network interface 105 communicably coupled with first server 102 via router and LAN (Local Area Network) 104. The first client device 109 may have a human user (not shown) who is a software programmer. The second client device 125 may have a second human user (not shown) who is a business owner or other layperson. Further, in some embodiments, the first client 109 is communicably coupled with the first server 102 and with the second server 103 via intranet 111D and router and LAN 104. In some embodiments, the first client 109 is communicably coupled with the first server 102 and the second server 103 via the Internet 111C and router and LAN 104.

Figure 2:
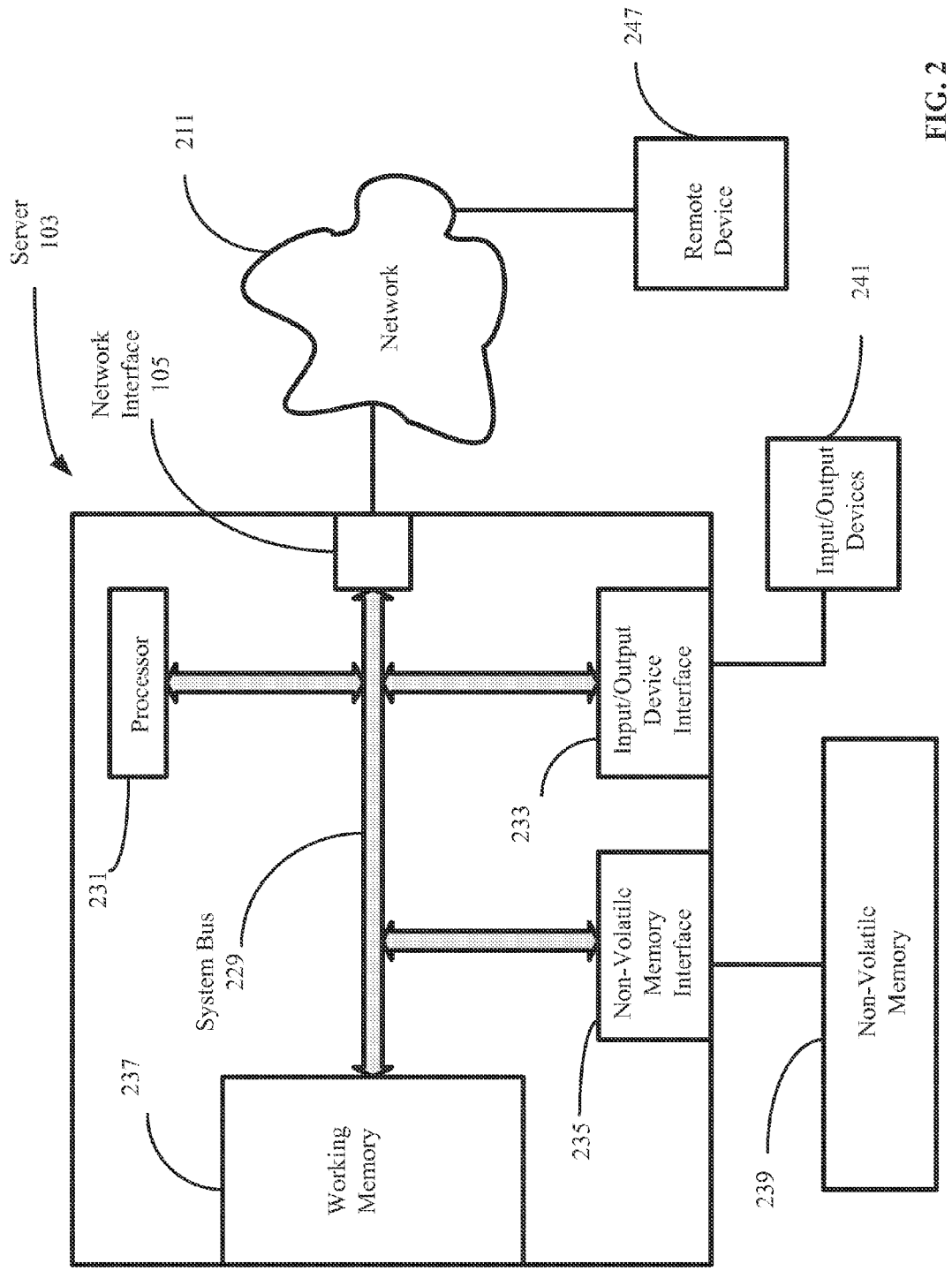
FIG. 2 is a block diagram of a server in which some embodiments may be implemented.

Referencing FIG. 2, in some embodiments, server 103 may include network interface 105, processor 231, working memory 237, non-volatile memory interface 235, input/output device interface 233, all of which are communicably coupled by system bus 229. In some embodiments, processor 231 includes some on-chip or off-chip cache memory (not shown). In some embodiments non-volatile memory interface 235 is communicably coupled with non-volatile memory 239. Input/output device interface 233 is communicably coupled with input/output devices 241. In some embodiments, input/output devices 241 may be configured to accept commands that cause server 103, or components thereof, to execute part or all of a process. In some embodiments, server 103 may be configured to execute part or all of a process without receiving commands via input/output devices 241. In some embodiments, server 103 is communicably coupled with a remote device 247 via network interface 105 and network 211. In some embodiments, network 211 is a local area network or a Wi-Fi network. In some embodiments, network 211 is the Internet.

Figure 3:
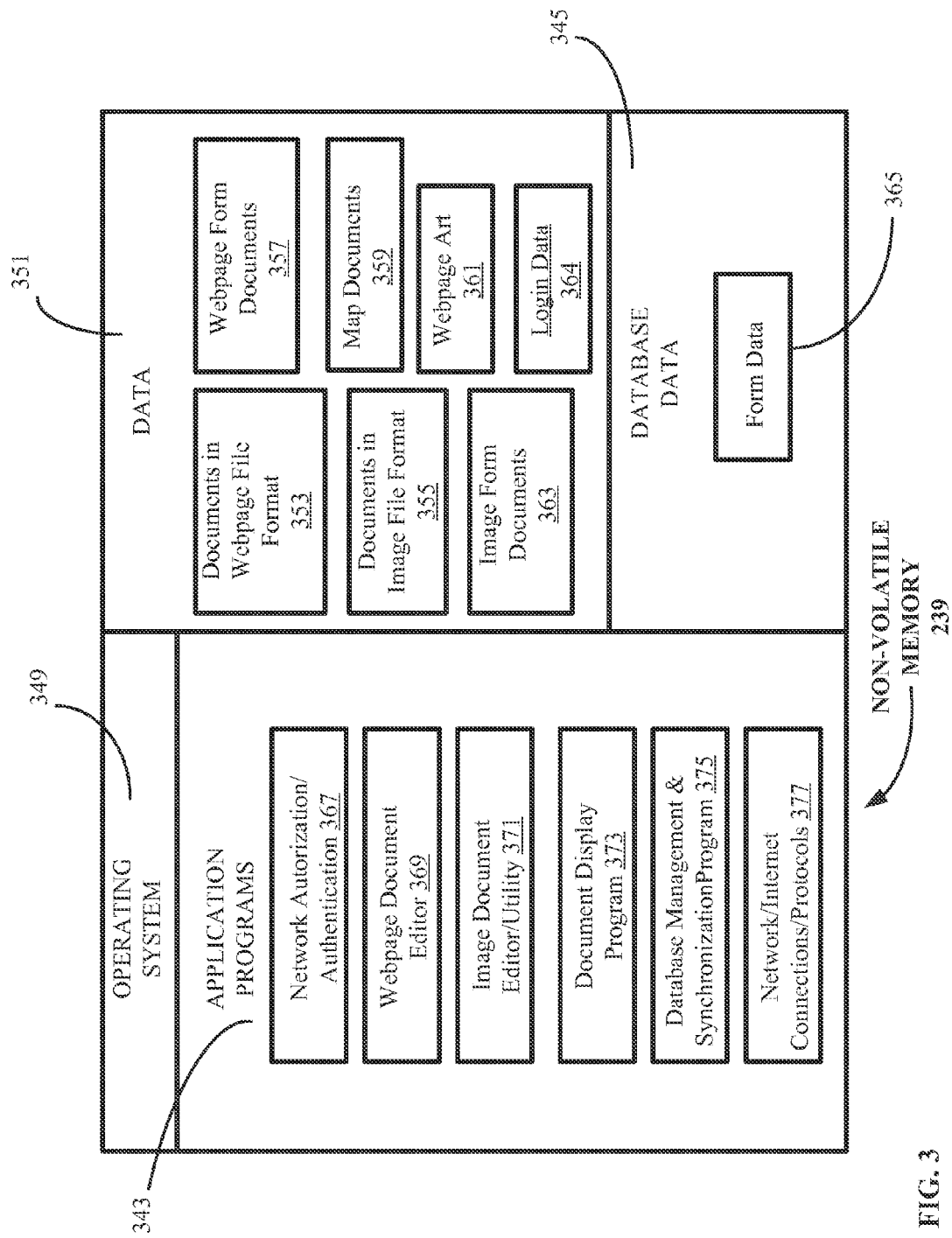
FIG. 3 is a detailed block diagram of a non-volatile memory from the server of FIG. 2, showing an operating system, application programs, data, and a database.

Referencing FIG. 3, in some embodiments, non-volatile memory 239 of server 103 of FIGS. 1-2 includes at least one hard drive. In some embodiments non-volatile memory 239 includes at least a flash memory. In some embodiments, non-volatile memory 239 includes other non-volatile memory known to those of ordinary skill in the art. In some embodiments, non-volatile memory 239 is the computer-readable storage medium (Item 1210 of FIG. 12) bearing non-volatile program instructions that are executable by server 103. In some embodiments, non-volatile memory 239 is a computer-readable storage medium that bears non-volatile computer-executable instructions that when executed, cause second server 103 to perform at least Process Blocks 410 and 414-420 of method 400 of FIGS. 4 and 4A.

In some embodiments, includes an operating system 349. In some embodiments, non-volatile memory 239 includes application programs 343. In some embodiments, non-volatile memory 239 includes data 351, including various user data. In some embodiments, non-volatile memory 239 includes database data 365. The above are stored on non-volatile memory as non-volatile instructions and data.

In many operations, at least a portion of operating system 349, application programs 343, data 351, and/or database data 345 is copied to working memory 237 of FIG. 2 for access thereto by processor 231 via system bus 229. Thus, circuitries and/or means for performing many operations include at least one or more of non-volatile memory 239 (and stored data 351, 345 and instructions 343,349), non-volatile memory interface 235, working memory 237, system bus 229 and the processor 231. In some embodiments, the above are at least some of the circuitries or means for performing at least the portion of method 400 that is described with reference to Process Blocks 410 and 414-420 of FIGS. 4 and 4A.

Further referencing FIG. 3, in some embodiments, non-volatile memory 239 includes login data 364 and a network authorization/authentication program 367. In some embodiments, login data 364 includes encrypted data and network authorization/authentication program 367 includes encryption and decryption capabilities. In some embodiments, network authorization/authentication program 367 executes in conjunction with one or more network/Internet connections protocols 377. The various network and Internet protocols are known to those skilled in the art and, depending on the particular implementation, may include one or more of Internet Protocol (IP) and Transmission Control Protocol (TCP).

In some embodiments, non-volatile memory 239 includes a database management and synchronization program 375 and database data 345, including form data 365. In some embodiments, database 127 of FIG. 1 is a Structured Query Language (SQL) type database, such MySQL. In particular embodiments, database management and synchronization program 375 includes MySQL or SQL. In some embodiments, database 127 of FIG. 1 is an object-oriented database. In particular embodiments, database management and synchronization program 375 includes OQL (Object Query Language).

The database management and synchronization program 375 would also include the capability to synchronize with other similar types of databases, either SQL or OQL, and be accessible via a Local Area Network (LAN), wired or wireless networks, or via the Internet. Most POS (Point-of-Sale) systems utilize an SQL-type database. Using the restaurant application example, a user would be able to simultaneously update or synchronize not only a restaurant's hardcopy menu and online menu, as previously described in this document, but immediately after this, also update the menu data residing in the restaurant's POS (Point Of Sale) system. This will likely require cross-licensing agreements with the various POS system manufacturers to enable synchronous communication with their customer's POS databases, along with suitable interface software to allow communication and/or synchronization between both databases. When the command "Synchronize POS" is invoked, the form data 365 is synchronized with the external POS database that is stored in a separate database on a separate database server (not shown). Alternatively, the licensed POS system manufacturer could include this capability in their POS system software.

In some embodiments, non-volatile memory includes a web document editor 369. In particular embodiments, web document editor 369 includes an online editor that is configured to be used, for example, by a human user of second client device 113 accessing second server 103. In some embodiments, non-volatile memory includes documents in a webpage file format 353 (also, "webpage documents 353"), webpage form documents 357 for entering editing data for editing documents (e.g., a webpage document 353, image document 355), map documents 359 for navigating about one or more webpage form documents 357 when performing editing, and webpage art 361. In some embodiments, a user or client device enters editing data into a webpage form document and then both a webpage document and an image document are updated at least in part with the editing data In some embodiments, at least the documents in the webpage file format 353 may be edited with web document editor 369. For example, if webpage document is a document in HTML format, it may be edited with web document editor 369, where web document editor 369 includes an HTML editor.

Although FIG. 3 illustrates application programs 343 with certain labels and categories, in some embodiments, the various application programs may have different names or categories. For example, a single application program may perform the functions of webpage document editor 369 and document display program 373. Or, conversely, three or more application programs may perform the functions of at least webpage editor 369 and document display program 373. The labels and categories used are merely examples provided for purposes of illustration and to explain the concepts and are not intended to be limiting.

In some embodiments, a user of first client device 109 or second client device 113 may access web document editor 369 and one or more webpage form documents 357 to edit one or more documents (e.g., webpage document 353, image document 355). In some embodiments, a user may further access map documents 359 to navigate about the one or more webpage form documents 357 when operating web document editor 369 to edit one or more documents (e.g., a webpage document in a webpage file format 353, image document in an image file format 355). In some embodiments, webpage art 361, includes art that functions as a map document 359. For example, webpage art 361 may include a picture of an illustrated portion of a document in a webpage file format 353. Then, clicking with a mouse (one of input/output devices 241 of FIG. 2) on the picture may cause server 103 to allow editing of the illustrated portion of the document in the webpage format 353. In this application, when discussing map documents 359, reference is also being made to web art 361 configured to function as a map document. In some embodiments, webpage art 361 is stored in non-volatile memory 239 in an image file format, but is capable of being embedded in a webpage document 353 either as ordinary art or as an art hyperlink.

In some embodiments, non-volatile memory 239 includes image document editor utility 371 for editing at least one of documents in image file format 355 (also, "image documents 355"), and image form documents 363. In some embodiments, image document editor/utility 371 may be capable of creating, updating or editing form data 365. In some embodiments, form data 365 is created from one or more image form documents 363. In some embodiments, the image document editor/utility includes PDFTK (PDF Took Kit), an open source product.

In some embodiments, non-volatile memory 239 includes a document display program 373. In particular embodiments, document display program 373 may cause server 103 to display at least one of documents in a webpage file format 353, webpage form documents 357 or map documents 359 in display 115 of second client device 113. In particular embodiments, document display program 375 may cause server 103 to display an editing interface (discussed below) on the display 115 of second client device 113.

Figure 4:
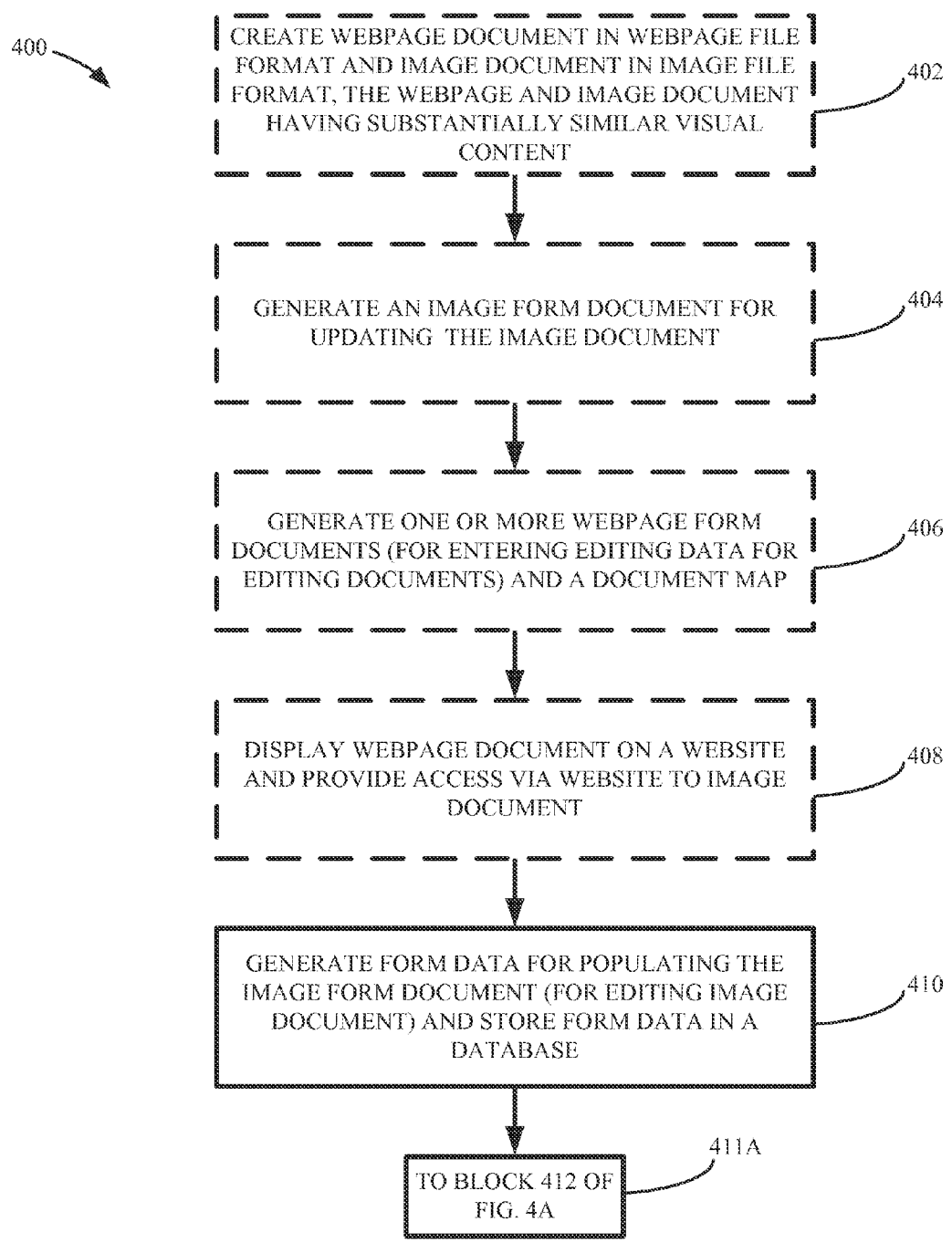
FIGS. 4 and 4A is a flowchart of a method for editing documents online with an editing interface in accordance with some embodiments.

Referencing FIG. 4, some embodiments include a method 400 of editing documents online. In some embodiments, method 400 is implemented with one or more of the circuitries and means discussed with reference to FIGS. 1-3. Although FIG. 4 displays process blocks in a given sequence, the sequence is for ease of explanation and convenience. The sequence of the process blocks in FIG. 4 is not limiting. For example, in some embodiments, activities in two process blocks may be reversed or the activities may be performed simultaneously or concurrently (e.g., Process Blocks 416 and 418). Unless the context or the discussion indicates otherwise, the process blocks are not required to be performed either simultaneously or in any particular order.

Referencing process block 402, in some embodiments, method 400 optionally includes creating an image document in an image file format 355 and a webpage document in a webpage file format 353. As discussed above, in some embodiments, a webpage document and an image document are merely different versions of the same printed document. Therefore, their viewable content is at least substantially similar.

In some embodiments, means and circuitry for creating the image document 353 include at least the first client device 109 and non-volatile executable document programs 112 that are stored in non-volatile memory (not shown) of the first client device 109. In some embodiments, the executable document programs 112 include Adobe InDesign. The image document 353 is created with the first client device 109 and the InDesign program. The image document 353 is then saved in non-volatile memory of first client device 109 in an image file format, such as a PDF.

In some embodiments, the image document 353 is formed by obtaining an image of a hard copy document. In some embodiments, means or circuitry for obtaining the image of the hard copy document include at least scanner 110 and the first client device 109 of FIG. 1. In some embodiments, image document 353 is obtained by scanning the hard copy document with scanner 110 of FIG. 1. Scanner 110 creates the image document in an image file format 353 and communicates the image document to first client device 109.

In some embodiments, the image file format is Adobe PDF. For example, if the hard copy document is a restaurant menu, then with scanner 110, an electronic version of the restaurant menu is created in an image file format, such as PDF. The PDF menu is communicated by scanner 110 to client device 109. In this example, the PDF menu is the image document 355.

In some embodiments, artwork is scanned with, for example, scanner 110 to form webpage art 361 of FIG. 3. In some embodiments, the webpage art 361 is capable of being embedded in a webpage document, such as one of documents in a webpage format 353 of FIG. 3.

In some embodiments, the user of client device 109 is a designer. In some embodiments, circuitries and means for creating documents in a webpage format 353 include at least client device 109 and document programs 112. With the client device 109 and the document programs 112, the designer creates a webpage document in a webpage file format. The webpage document 353 may be based on the image document because, in some embodiments, the webpage document and the image document are merely different versions of the same printed or hardcopy document.

In some embodiments, document programs 112 includes a program for creating a document in a webpage format 353 from a document in an image file format 355. For example, document programs 112 may include a program for creating an HTML document from a PDF document. In these embodiments, the designer may create the webpage document 353 directly from the image document 355.

In some restaurant menu embodiments, the webpage document is an electronic version of the menu in a webpage format, such as HTML. In some embodiments, the webpage document and the image document have at least substantially similar visual content.

Referencing Process Block 404, in some embodiments, the method 400 optionally includes generating an image form document 363, for editing or updating the image document 355. The image form document 363 is in an image file format. In some embodiments, circuitries and means for generating the image form document 363 include at least the first client device 109 and the document programs 112 stored in memory of the first client device 109. In some embodiments, the image form document is generated by adding form fields into the image document with the first client device 109 and the document programs 112.

In some restaurant menu embodiments, the image form document is a PDF master document that is created by inserting form fields into the PDF restaurant menu with the first client device 109 and Adobe Acrobat of document programs 112.

In some embodiments, Process Block 404 further includes transmitting the one or more image form documents 363, image document 355 and/or webpage art 361 to a server, such as second server 103 of FIG. 1. In some embodiments, circuitries and means for transmitting the one or more image form documents 363, image document 355 and/or webpage art 361 to second server 103 include at least the first client device 109 transmitting via the first network 111A and routes 104D, 104A. Second server 103 includes means and circuitries for accepting and storing the transmitted documents and images. In some embodiments, second server 103 receives the one or more image form documents 363, image document 355 and/or webpage art 361 with network interface 105 as input data for subsequent procedures, discussed below. In some embodiments, processor 231 of second server 103 causes the one or more image form documents 363, image document 355 and/or webpage art 361 to be stored in non-volatile memory 239.

Referencing Process Block 406 of FIG. 4, in some embodiments, method 400 optionally includes generating one or more webpage form documents 357 for entering editing data for editing one or more documents (e.g., webpage document 353, image document 355). In some embodiments, both a webpage document 353 and an image document 355 are updated or edited with editing data that is entered into a webpage form document 357. In some embodiments, method 400 optionally includes generating one or more map documents 359 for navigating about the one or more webpage form documents 357 when editing a webpage document 353 and an image document 355. In some embodiments, means and circuitries for generating at least one of a webpage form document 357 or a map document 359 include at least the client device 109 and document programs 112. In some embodiments, the webpage form documents 357 are generated as HTML input forms. In some embodiments, map documents 359 are generated as HTML menu maps. In some embodiments, map documents 359 includes hyperlinks that can be "clicked on" to navigate about one or more webpage form documents 357. In some embodiments, map documents 359 includes hyperlinked webpage art 361 that can be "clicked on" to navigate about a webpage form document 357.

In some embodiments, Process Block 406 further includes transmitting the one or more webpage form documents 357, the one or more map documents 359 and/or webpage art 361 to a server, such as second server 103 of FIG. 1. In some embodiments, means and circuitries for transmitting the one or more webpage form documents 357, the one or more map documents 359 and/or webpage art 361 to second server 103 include at least first client device 109 via the first network 111A and routes 104D, 104A. Second server 103 includes means and circuitries for accepting and storing the transmitted documents and images. In some embodiments, second server 103 receives the one or more webpage form documents 357, the one or more map documents 359 and/or webpage art 361 with network interface 105 as input data for subsequent procedures, discussed below. In some embodiments, processor 231 of second server 103 causes the one or more webpage form documents 357, the one or more map documents 359 and/or webpage art 361 to be stored in non-volatile memory 239.

Referencing Process Block 408 of FIG. 4, in some embodiments, method 400 optionally includes displaying the webpage document 353 on a webpage and providing access, for example by a hyperlink, from the webpage to the image document 355. The webpage document may be viewed with a web browser and the image document may be downloaded and printed. In some embodiments, circuitries and means for displaying webpage document 353 on the webpage include at least first server 102 of FIG. 1 which may be a web server which hosts websites. First server 102 may also provide access from the webpage to the image document 355.

In some embodiments, first server 102 may be the same physical server as second server 103. In some embodiments, the webpage document 353 and/or the image document 355 are transmitted from second server 103 via first network 111A to first server 102 for web hosting services. In some embodiments, the webpage document 353 and/or image document 355 are transmitted from first client device 109 via first network 111A to first server 102 for web hosting services.

Referencing Process Block 410 of FIG. 4, in some embodiments, method 400 includes generating form data 365 for populating the image form document 363 and storing form data 365 in a database, such as database 127 of the second server 103 of FIG. 1. In some embodiments, the form data 365 is stored in a separate database on a separate database server (not shown).

In some embodiments, circuitries and means for generating form data 365 include at least image document editor/utility 371, which generates form data 365 from image form document 363. In some embodiments, circuitries and means for storing form data 365 as database data 345 include at least at least processor 231 and database management and synchronization program 375 which store form data 365 in non-volatile memory 239 of second server 103 of FIG. 3. In some embodiments, form data 365 may be stored or retrieved from a database with structured query language (SQL). In some embodiments, form data 365 may be stored or retrieved in virtually any known database query language.

In some embodiments, form data 365 is Adobe Forms Data Format. In these embodiments, means or circuitry for generating form data 365 includes at least the image document editor/utility 371 which is PDF Tool Kit (PDFTK), an open source, cross-platform tool. In some embodiments, in addition to the FDF data, a flat or printable PDF document is created with PDFTK. In some further embodiments, with PDFTK, the FDF data is cleansed, removing all non-printable characters, before storing the FDF data in database 127.

In some embodiments, circuitries and means for generating the form data 365 include at least processor 231 and image document editor/utility 371, which generate the form data 365 in a data management file format. The data management file format can be virtually any known database data file type. Without limitation, in some embodiments, the data management file format is at least one of FDF (Forms Data Format), XML (Extensible Markup Language), CSV (Comma Separated Values), TSV (Tab Separated Values), Text, or JSON (JavaScript Object Notation).

Figure 4A:
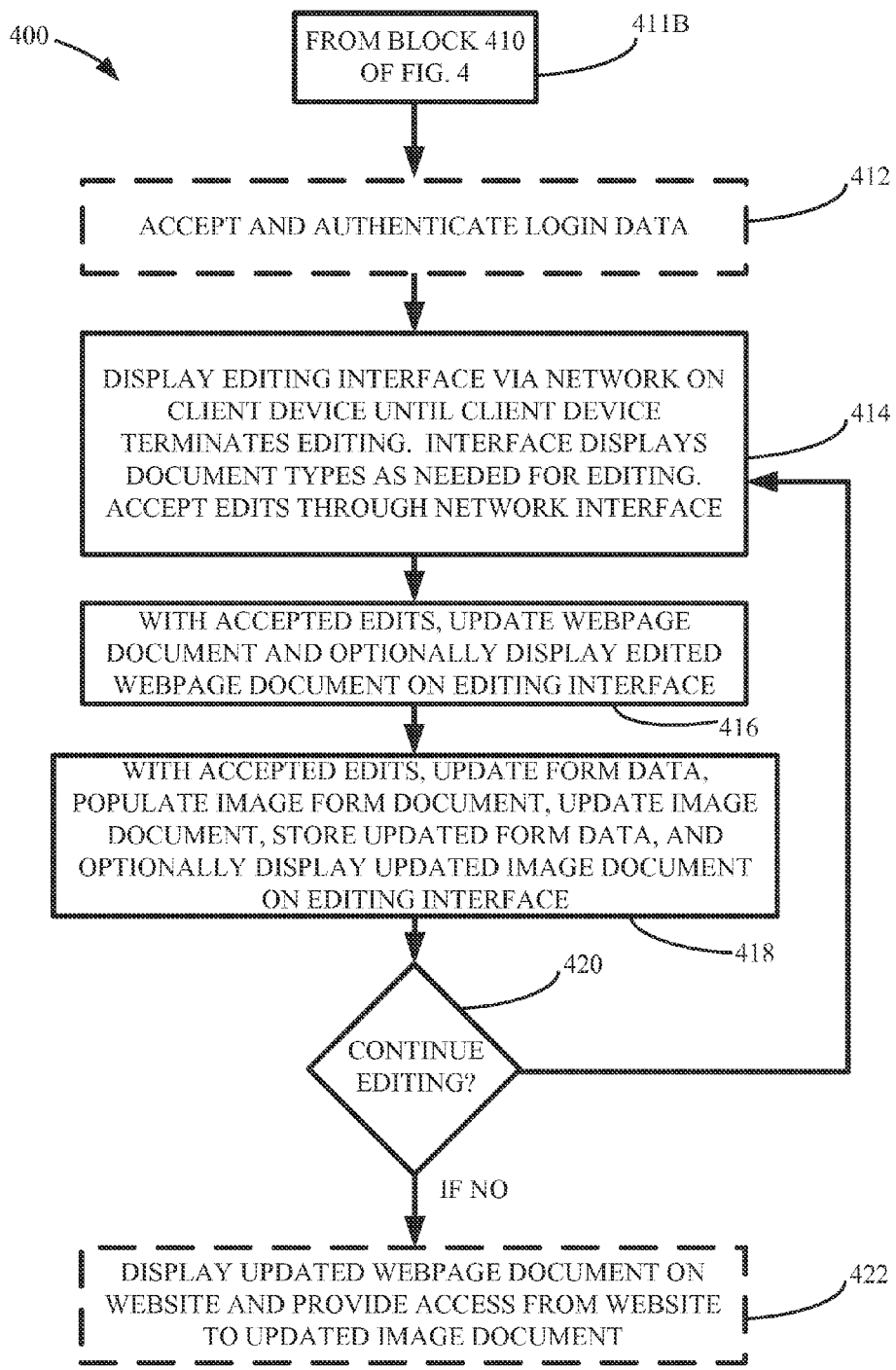

Referencing FIGS. 4 and 4A, as indicated at Process Blocks 411A, 411B, in some embodiments, method 400 is continued from FIG. 4 to FIG. 4A.

Referencing Process Block 412 of FIG. 4A, in some embodiments, method 400 may optionally include accepting and authenticating login data 364 (FIG. 3). In some embodiments, login data 364 is accepted and authenticated via a second network 111B from a second client device 113, the login data 364 corresponding to a human user (not shown) of second client device 113. In some embodiments, the second client device 113 is the same device as the first client device 109 and both the first network 111A and the second network 111B are the Internet. In some embodiments, the second network 111B is the same as, is part of, or includes first network 111A or vice versa. In some embodiments, second network 111B is an intranet and first network 111A is the Internet. In some embodiments, second network 111B is the Internet and first network 111A is an intranet.

In some embodiments, circuitries and means for accepting, authenticating and storing login data 364 include second server 103 generally, and in particular, at least processor 231, network interface 105, non-volatile memory 239 and network authorization/authentication 367. In some embodiments, the login data 364 is authenticated by processor 231 and network authorization/authentication 367. In some embodiments, login data 364 is encrypted and network authorization/authentication 367 decrypts the login data 364 and/or may cause the login data 364 to be stored in encrypted form as login data 364 of data 351 of non-volatile memory 239.

Referencing Process Block 414 of FIG. 4A and further referencing FIG. 1, in some embodiments, method 400 includes, displaying an editing interface via a network to a client device. In some embodiments, a server presents the editing interface to a client via a network in a single browser window. The single browser window may display, as requested by a client device, at least one of one or more form documents, one or more map documents, web art, a webpage document and/or an image document. In these embodiments, either the documents or the browser (now shown) include controls, buttons, or hyperlinks for obtaining the desired document or content for editing in the editing interface. The sequence and content in which content that is displayed to the client device is dependent upon the programming of the particular server and the commands/requests issued by the client device to the server.

In some embodiments, the network interface displays: 1) one or more webpage form documents, one or more map documents and/or web art; and 2) an image document, showing the most recent version of the text and graphics of the webpage document or image document. The above may be displayed to the client device in a number of ways dependent on the programming of the server and the commands/requests issued by the client device to the server.

In some embodiments, method 400 includes, with second server 103, displaying an editing interface 150 to a second client device 113 via a second network 111B, the displayed editing interface 150 having a first portion 152 and a second portion 154. The editing interface being displayed, for example, on display 115 of second client device 113.

In some embodiments, the first portion 152 may display at least one of one of one or more webpage form documents 157, one or more map documents 159 for navigating about the one or more webpage form documents or some other displayed document, and/or webpage art 161.

In some embodiments, the second portion 154 may display an image document 155, to show the text and graphics being edited. In some embodiments, second portion 154 may display a webpage document 153 for editing. In some embodiments, the second portion may display a webpage form document 157 or some other document.

In some embodiments, the first portion 152 and the second portion 154 may display other content. For example, in some embodiments, the first portion 152 may display a map document and the second portion may display a webpage form document. As a further example, in some embodiments, the first portion 152 may display a map document and the second portion may display an image document 155 or a perhaps a webpage document 153. Other combinations or content are possible. In some embodiments, the particular content displayed in the first portion 152 and second portion 154 is dependent upon the programming of the server and the commands/requests made by the client device as the client device proceeds with viewing and editing.

The editing interface 150 is configured to accept editing data, for editing the webpage document 153 and the image document 155, from the second client device 113. In some embodiments, only one of the first portion 152 or the second portion 154 of the editing interface 150 accepts editing data (e.g., editing data 862B, 866B, 868B of FIG. 8C).

In some embodiments, circuitry or means for displaying an editing interface includes at least second server 103. More particularly, circuitry or means for displaying an editing interface include at least processor 231, network interface 105, and application programs 343 that may include document display program 373 and network/Internet connections/protocols 377. In some embodiments, the displaying of the editing interface on the client device is at least partly responsive to the accepting and authentication of login data (367 and 364, FIG. 3 and Process Block 410, FIG. 4A). In some embodiments, the displaying of the editing interface 150 to the second client device 113 is at least partly responsive to a command entered by a human user (not shown) on input/output devices 241 of the second server 103.

Moving forward with reference to FIG. 7, in some embodiments, a user (not shown) of the second client device 113 accesses second server 103 via an administrative panel (794 of FIG. 7) that is displayed on the second client device 113 by second server 103. On the administrative panel 794, a user may select, for example, a menu selection 796, indicating a desire to edit a menu. Or, a user may select, as a further example, a takeout menu selection 797 indicating a desire to edit a takeout menu. Moving forward with reference to FIG. 6, in some embodiments, to proceed further, the user of the second client device 113 may be required to enter login data 664 on a login page 691 displayed on the second client device 113.

Further referencing FIGS. 1 and 4A, in some embodiments, the first portion 152 and the second portion 154 of the network interface 150 are respectively, first and second windows, displayed side-by-side for simultaneous viewing. Or the windows may be layered or tiled allowing a user to use a user input device (not shown) of second client device 113, to switch between the first and second windows. In some embodiments, the first portion 152 and the second portion 154 of the editing interface are, respectively, first and second frames of a webpage. The first and the second portions 152, 154, may be displayed in a variety of different configurations. Further, in some embodiments, there may not be a first and second portion 152, 154, and the network interface may be displayed in a single window.

Further referencing Process Block 414 of FIG. 4A, in some embodiments, method 400 includes accepting editing data submitted to the editing interface, for example, editing interface 150 of FIG. 1. In some embodiments, the editing data is submitted by a client device to the editing interface by entering the editing data into a displayed webpage form document 357 and then activating an "update" button (e.g., update button 876, FIG. 8C). In some embodiments, circuitries and means for accepting of the editing data includes second server 103 generally, and in particular at least network interface 150, the processor 231, the webpage document editor 369, the document display program 373 of the second server 103, and network/Internet connections/protocols 377. The webpage document editor may be responsive to commands entered in the editing interface by a user (not shown) of the second client device 113. For example, in some embodiments, a user of the second client device 113 enters edits in webpage form document 357, displayed by document display program 373, and enters an "update" command to send the edits (i.e., the editing data) to second server 103. In some embodiments, second server 103 receives and accepts the edits at least with network interface 150, processor 231, and network/Internet connections/protocols 377. In some embodiments, webpage document editor 369 and image document editor/utility 371 also accept the editing data for making edits.

Referencing Process Block 416 of FIG. 4A, in some embodiments, with the accepted edits, webpage document 153, 353 is updated. In some embodiments, webpage document 153, 353 is updated with the webpage form document 357 and with the editing data entered into the webpage form document 357. In some embodiments, circuitry and means for updating (i.e., editing) webpage document 353 include at least second server 103 in general, and in particular at least processor 231 and webpage document editor 369.

In some embodiments, the webpage document 153 is an HTML document, webpage form document 357 is one or more HTML input forms and the webpage document editor 369 is an HTML editor that is responsive to commands entered into the editing interface 150 via the second client device 113. For example, client device 113 may enter editing data (e.g., editing data 862B, 866B, 868B of FIG. 8C) into an HTML input form (an embodiment of a webpage form document 357) with the HTML or online editor and then enter an update command. Second server then updates the HTML document with the HTML input form and the entered editing data. Means and circuitry for updating the HTML document include second server 103 in general, and in particular at least processor 231, and HTML or online editor.

Optionally, in some embodiments, updated webpage document 153, 353 is displayed with the network interface, for example, network interface 150. Circuitry and means for displaying the updated webpage document 153, 353 in the network interface include second server 103, in particular at least processor 231, webpage document editor 369 and document display program 373. In some embodiments, second server 103, is responsive to commands/requests from first client device 109 in displaying or not displaying updated webpage document 153, 353 in the network interface.

Referencing Process Block 418, in some embodiments, method 400 includes retrieving form data 365 from a database, for example, database 127, and updating the form data 365 based on the accepted editing data (e.g., edited prices 862A of FIG. 8C). Image form document 363 is populated with the updated form data 365 to create an updated image document 355. The updated form data 365 is stored in a database, for example, database 127. In some embodiments, the circuitry and means for the updating of the form data 365, the populating of image form document 3363, and the updating of image document 155, 355 include at least, for example, processor 231 and image document utility 371 and processor 231. In some embodiments, the circuitry and means for retrieving form data 365 from and storing updated form data 365 in a database includes at least processor 231, database management and synchronization program 375, and non-volatile memory 239.

In some embodiments, image document 355 is a PDF document. To update the PDF document, the form data 365, which may be FDF or XML data, is retrieved from a database, for example, database 127. FDF data is updated with PDFTK. The image form document 355, a master PDF, is populated with the updated FDF data with, for example, PDFTK or another program for manipulating PDF files and processor 231.

In some embodiments, the updating of the image document 155, 355 as described with reference to Process Block 418 is performed substantially simultaneously or concurrently with the updating of the webpage document 153, 353 as described with reference to Process Block 416. The updating of the webpage document 153, 353 and the updating of the image document 155, 355 are both based on the same accepted editing data. In some embodiments, both sets of updates are performed substantially simultaneously or concurrently each time a user enters new editing data in editing interface 150 and indicates an update command by clicking on an "update" button (e.g., button 876 of FIG. 8C) in the editing interface (interface 850B of FIG. 8C). Thus, a user of client device 113 may update both image document 355 and webpage document 155 with the same editing data using webpage document editor 369 (which in some embodiments is a simple editor). As noted above, in some embodiments image document 355 and webpage document 353 are merely different versions of the same hardcopy or printed document.

In some embodiments, a user of second client device 113 may view the updated webpage document or updated image document in the editing interface 150 by clicking on the "reload" button or icon (not shown) on a browser window.

Referencing Process Block 420, in some embodiments, method 400 includes continuing to display the editing interface 150 until an indication is received that the second client device 113 has terminated editing. In some embodiments, the circuitry and means for continuing to display the editing interface include at least second server 103, which continues to display the editing interface 150 with, for example, the document display program 373 and network/Internet connections/protocols 377, until an indication is received by second server 103 that the second client device 113 has terminated editing the webpage document 153, 353. In some embodiments, the indication may be a termination of a session noted by, for example, processor 103 and network/Internet connections/protocols 377. In some embodiments, the indication may be the receipt and processing of a logout signal by, for example, network authorization/authentication 367 and processor 231 of second server 103.

Referencing Process Block 422, in some embodiments, method 400 optionally includes displaying the updated webpage document 353 on a webpage and providing access from the webpage to the updated image document 355. In some embodiments, the circuitry or means for the displaying includes at least first server 102. In some embodiments, after the updating of the webpage document 153, 353 and the image document 155, 355, these documents are transmitted by second server 103 to first server 102.

Referencing FIG. 5, an embodiment of an editing interface 550 is shown. Editing interface 550 includes a first portion and a second portion that are respectively, first window 552 and second window 554. The windows 552, 554 are aligned side-by-side for simultaneous viewing in two web browser windows of a client device, such as second client device 113. Each of windows 552, 554, has its own scroll bar 553A, 553B. In some embodiments, these windows 552, 554, are first and second frames of a browser (not shown) window.

The first window 552 displays a webpage editing form document 557, in this case for a restaurant menu. Webpage editing form document 557 includes editable prices 562, editable descriptions 564 of various dishes, editable names 566 of menu items, and editable legends 568. The second window 554 displays an image document 553, in this case a PDF version of a menu.

Referencing FIGS. 8A-8E, an embodiment of an editing interface 850A (no edits shown), 850B (showing processed edits) is shown.

Referencing FIG. 8A, a first window 852A of editing interface 850A is shown with no edits. First window 852A displays a webpage form document 853A, in this case, an HTML input form. The HTML input form 853A, an editable form document of a menu, has unedited prices 862A, editable descriptions 864A, editable names 866A, and editable legends 868A.

Referencing FIG. 8B, the second window 854A of editing interface 850A of FIG. 8A is shown. Second window 854A displays web document 853A—the document to be edited—but without any edits. In another embodiment, second window 854A could display an image document. Web document 853A is an HTML version of the menu of FIG. 8A. Web document 853A has unedited prices 862A and a link 880 (e.g., an HTML hyperlink) to an image document, in this case a PDF version of the menu (not shown).

Referencing FIG. 8C, the editing interface 850B, first window 852B, and web form document 857B are the same as editing interface 850A, first window 852A, and web form document 857A of FIG. 8A, except that prices, a name, and a legend have been edited: edited prices 862B. In some embodiments, editing interface 850B is shown on a client device, for example second client device 113 of FIG. 1. In some embodiments, the displaying is being performed by a server, for example second server 103 of FIG. 1. Web form document 857B has an "update" icon or button 876 that can be "clicked-on", for example with a mouse (not shown), to signal the server to update the webpage document associated with the editing interface 850B. Server may then accept the editing data (e.g., changed prices 862B) and update both a webpage document 853A and a corresponding image document as is discussed above with reference to Process Blocks 416, 418 of FIG. 4A.

Referencing FIG. 8D, the editing interface 850B, second window 854B, and webpage document 853B are the same as editing interface 850A, second window 854A, and webpage document 853A, except that edited prices 862B have been entered and the webpage document 853B has been updated. Perhaps substantially simultaneously or concurrently, the corresponding image document (PDF version of the menu) that is accessible via link 880 has also been updated.

Referencing FIG. 8E, second window 854C and image document 853C, illustrates that editing and updating via editing interface 850B results in the automatic and substantially simultaneous or concurrent updating and display of the same edited changes in both the webpage document 853B and the image document 853C. As used herein, substantially concurrently refers to a window of time within which a computer would be expected to complete two update operations that are running concurrently. In some embodiments, substantially concurrently refers to a window that is no greater than 15 seconds. However, on a busy server, the window of time may be greater. In some embodiments, substantially concurrently refers to a window that is no greater than 1 second.

In some embodiments, when the update operations are in response to an update command issued in response to clicking on update button 876, the updating of the webpage document (e.g., 353) and the corresponding image document (e.g., 355) is performed concurrently by processor 231 of second server 103. In some embodiments, processor 231 comprises two or more processors or processor cores. Thus, in some embodiments, at least a portion of the update operations may be performed in parallel rather than concurrently.

Although the embodiments of FIGS. 8A-8E show first and second windows 852, 854 that are viewable simultaneously, in alternative embodiments first and second windows are windows that do not share a browser page and may be viewable in separate browser windows that must be individually selected for viewing (e.g., by a mouse click to select a window for viewing). Other embodiments are also possible.

Referencing FIG. 9A, an embodiment of an editing interface 950 includes first window and 552 and second window 554. First window displays a map document 559 and the second window displays webpage editing form document 557. In this embodiment, the webpage editing form document 557 depicts a menu. The map document 559 includes document portion link 570 for moving to a desired portion of webpage editing form document 557.

Referencing FIG. 9B, an embodiment of an editing interface 950 includes first window 552 and second window 554. First window 552 displays a map document 559 and the second window 554 displays an image document 555. In this embodiment, the image document 555 is an image document, a single page of the multiple-page menu document. Map document 559 that allows access to selected pages of the menu document, via document portion link 570. Second window 554 displays the image document 555 of the menu document.

Referencing FIG. 10, an embodiment of an editing interface 1050 includes first window 552 and second window 554. First window 552 includes editing form 1057. Editing form 1057 displays miniaturized removable document portions 772, which allows a user of a client device, in which editing interface 1050 is displayed, to delete portions of an image document. In this case, the delete operation is performed by selecting (e.g., by clicking with a mouse) a delete button 774 of Editing form 1057. Editing form 1057 also includes a file upload form 776 which allows a user of the client device, for example second device 113 of FIG. 1, to locate and select a file to upload and incorporate into Editing form 1057 and the associated image document. The upload operation is performed by selecting the "upload" button 778 (e.g., by clicking on button 778 with a mouse). The second window 554 displays image document 1053, the finished results of Selecting/Uploading/Rebuilding functions of the takeout menu (See FIGS. 10 & 11), where all selected menu pages are assembled and combined and automatically reduced in size to fit a pre-determined and selected page size that is suitable for printing in a foldable takeout brochure format.

Referencing FIG. 11, an embodiment of an editing interface 1150 includes a first window 552 and a second window 554. The first window 552 includes Editing form 1157. Editing form 1157 includes miniaturized document portions (e.g., document portion 1172) and input fields (e.g., input fields 1174A, 1174B). A user of a client device in which editing interface 1150 is displayed may enter a numerical rank to arrange the order in which the document portions are displayed in, for example, image document 1053 of the second window 554. As shown, four document portions are shown with ranks 1 through 4 and two document portions are shown with no rank (so will not be displayed).

Referencing FIG. 12, a system 1200 includes a computer readable storage medium 1210 bearing non-volatile computer-executable program instructions that when executed by a computing device, cause the device to perform a process 1220. In some embodiments, the computer readable storage medium may be based on magnetic memory, an optical memory storage device or other memory technology. In some embodiments, the computer readable storage medium 1200 is a portion of a non-volatile memory, for example memory 239 of FIG. 3. In some embodiments, the computer readable storage medium is a computer hard drive, a redundant array of independent disks (RAID), a compact disk (CD), a DVD, a Blu-ray disk, a thumb drive, a flash memory, or other computer readable storage medium.

In some embodiments, the process 1220 includes displaying an editing interface 150 to a second client device 113, via a second network 111B, the displayed editing interface 150 including at least a first portion 152 and a second portion 154. The first portion 152 may display at least one or more webpage form documents 357 for accepting editing data for editing documents, or one or more map documents 359 for navigating about the one or more webpage form documents 357 when performing edits. In some embodiments, the second portion 154 may display one of the webpage document 153 in a webpage file format or an image document 155 in an image format. The editing interface 150 may accept editing data (e.g., edited prices 862B of FIG. 8C), from the second client device 113, for editing the webpage document 153, 353 and the image document 355.

In some further embodiments, the process 1220 includes, based on the accepted editing data, updating the webpage document 353.

In some further embodiments, the process 1220 includes accessing, from a database 127, form data 365 that is in a data management file format, updating the form data 365 based on the accepted editing data, populating an image form document 363 with the updated form data 365, the image form document 363 being in the image file format, and storing the updated form data 365 in the database 127.

In some further embodiments, the process 1220 includes generating, with the populated image form document 363, an updated image document 355. Thus, in some embodiments, both the webpage document 353 and the image document 355 are updated based directly, or indirectly, on the same editing data.

In some further embodiments, the process includes continuing to display the editing interface 150 until an indication is received that the second client device 113 has terminated the editing of the webpage document.

In some further embodiments, the process 1220 includes displaying, with the first server 102, the updated webpage document 353 on a webpage and providing access from the webpage to the updated image document 355.

In some further embodiments, the process 1220 optionally includes transmitting the updated webpage document 353 and image document 355 to web server 102 for display of the webpage document 353 on a webpage and for providing access to the image document 355 from the web page.

In some further embodiments, the process 1220 optionally includes accepting a webpage document 353, an image document 355, webpage form documents 357, map documents 359, and image form documents 363 and generating form data 365 from the image form documents 363. The form data 365 is generated in a data management file format. The form data 365 is stored in a database 127.

Referencing FIG. 13, in some embodiments, a system 1310 for editing documents online includes at least one of means 1330, means 1340, means 1350, and means 1360. In some embodiments, system 1310 optionally also includes means 1320 and/or means 1370. Although the means are stated as separate means, these are not necessarily separate means and in some embodiments one or more of means 1320, means 1330, means 1340, means 1350, means 1360, and means 1370 are the same means or share common structures or functions or otherwise partially or totally overlap. In some embodiments, one or more of means 1320, means 1330, means 1340, means 1350, means 1360, and means 1370 may be different means.

Means 1320 includes means for displaying a webpage document, in a webpage format, on a webpage and providing access from the webpage to an image document in an image file format.

Means 1330 includes means for displaying to a second client device, via a second network, an editing interface that includes at least a first portion and a second portion, the first portion displaying at least one of one or more webpage form documents for accepting editing data for editing one or more documents, or one or more map documents for navigating about the one or more webpage form documents when performing editing, the second portion displaying one of a webpage document or an image document in an image file format, the editing interface accepting editing data for editing the webpage document.

Means 1340 includes means for updating the webpage document based on the accepted editing data and for continuing to display the editing interface until an indication is received that the second client device has terminated the editing of the webpage document.

Means 1350 includes means for accessing, from a database, stored form data that is in a data management file format, for updating the form data based on the accepted editing data, for populating an image form document with the form data, the image form document being in an image file format, and for storing the updated form data in the database.

Means 1360 includes means for generating, with the populated image form document, an updated image document, the updated image document being in an image file format.

Means 1370 includes means for displaying the updated webpage document on a webpage and providing access from the webpage to the updated image document.

The foregoing embodiments and advantages are merely exemplary and are not to be construed as limiting the present invention. Those skilled in the art can appreciate from the foregoing description that the techniques of the embodiments of the invention can be implemented in a variety of forms. For example, the configuration of servers, client devices, and networks may be modified in numerous ways from that displayed and discussed, without departing from the principles discussed herein. Therefore, while the embodiments of this invention have been described in connection with particular examples thereof, the true scope of the embodiments of the invention should not be so limited since other modifications will become apparent to the skilled practitioner upon a study of the drawings, the specification, and the following claims.

What is claimed is:

1. A system for editing both a webpage document and an image document online, the system comprising:

a processor;

circuitry for displaying an editing interface to a client device, via one or more networks, the displayed editing interface being configured for receiving editing data, via the client device, for editing both the webpage document and the image document, the webpage document being in one or more webpage file formats and the image document being in one or more image file formats, the displayed editing interface including at least a first portion and a second portion, the editing interface being configured for displaying with the first portion of the editing interface at least one or more webpage form documents, that are in one or more webpage file formats, for entering editing data and the editing interface being configured for displaying with the second portion of the editing interface at least one of the webpage document or the image document;

circuitry for accepting the editing data;

circuitry for updating, automatically and substantially concurrently, both the webpage document and the image document based, at least in part, on the same accepted editing data, substantially concurrently including within a window of time that is no greater than 15 seconds, wherein the circuitry for updating, automatically and substantially concurrently, both the webpage document and the image document includes at least:

circuitry for updating the webpage document based at least in part on the accepted editing data;

circuitry for updating the image document based at least in part on the accepted editing data, the circuitry for updating the image document including at least:

circuitry for retrieving form data that is in one or more data management file formats from a database, for updating the form data based at least in part on the accepted editing data, for populating an image form document with the updated form data, the image form document being in one or more image file formats, and for storing the updated form data in the database;

circuitry for updating the image document with the image form document; and circuitry for continuing to display the editing interface until an indication is received that the client device has terminated editing;

circuitry for accepting first input data via the one or more networks from the client device, the accepted first input data including at least the webpage document and the one or more webpage form documents;

circuitry for accepting second input data via the one or more networks from the client device, the accepted second input data including the image document and the image form document; and circuitry for generating the form data, for populating the image form document with the generated form data, and for storing the form data in the database;

wherein the image document having been created by scanning a hardcopy document and the webpage document having been based at least in part on the image document and each of the image document and the webpage document thereby having substantially similar viewable content; and wherein the circuitry for displaying an editing interface is configured to display the first and second portions of the editing interface as, respectively, first and second windows, side-by-side for simultaneous viewing, in which:

the first window is configured for displaying at least the webpage form document for entry of editing data for editing both the webpage document and the image document, and the second window displaying at least the image document to be edited.

2. The system of claim 1, further comprising:

circuitry for displaying the webpage document on a webpage;

circuitry for providing access via one or more hyperlinks from the webpage to the image document;

circuitry for displaying the updated webpage document on the webpage; and circuitry for providing access via one or more hyperlinks from the webpage to the updated image document.

3. The system of claim 1, wherein the one or more networks include at least the Internet and one or more intranets.

4. The system of claim 1, wherein the client device includes at least a first client device and a second client device, the circuitry for displaying an editing interface being configured for displaying the editing interface to the first client device, the circuitry for accepting first input data being configured for accepting the first input data from the second client device, and the circuitry for accepting second input data being configured to accept the second input data from the second client device.

5. The system of claim 1, wherein at least one of the circuitries operates in response to a manual command issued by a human user of the system.

6. The system of claim 1, wherein at least one circuitry is not separate from at least one of the other circuitries.

7. The system of claim 1, further comprising circuitry for accepting and authenticating login data via the one or more networks from the client device, the login data corresponding to a human user of the client device, wherein the circuitry for displaying an editing interface displays the editing interface responsive to the accepted and authenticated login data.

8. The system of claim 1, wherein the webpage file format is at least one of HTML, XHTML, PHP, CSS (Cascading Style Sheets), Ruby, Python, or ASP (Active Server Pages).

9. The system of claim 1, wherein the image file format is at least one of PDF (Portable Document Format), TIFF (Tagged Image File Format), JPEG (Joint Photographic Experts Group), BMP (Bitmap Image File), PNG (Portable Network Graphics), XPS (XML Page Specification), GIF, or DjVU.

10. The system of claim 1, wherein the data management file format is one selected from the group consisting of FDF (Forms Data Format), XML (Extensible Markup Language), CSV (Comma Separated Values), TSV (Tab Separated Values), or Text.

11. The system of claim 1, wherein the first and second portions of the editing interface are, respectively, first and second frames of a webpage.

12. A method of editing both a webpage document and an image document online, the method comprising:

displaying an editing interface to a client device, via one or more networks, the displayed editing interface being configured for receiving editing data, via the client device, for editing both the webpage document and the image document, the webpage document being in one or more webpage file formats and the image document being in one or more image file formats, the displayed editing interface including at least a first portion and a second portion, the first portion displaying at least one or more webpage form documents for entering editing data, the second portion displaying at least one of the webpage document or the image document in an image file format;

accepting the editing data;

updating, automatically and substantially concurrently, both the webpage document and the image document based, at least in part, on the same accepted editing data, substantially concurrently including within a window of time that is no greater than 15 seconds, wherein the updating, automatically and substantially concurrently, both the webpage document and the image document includes at least:

updating the webpage document based at least in part on the accepted editing data;

updating the image document based at least in part on the accepted editing data, the updating the image document including at least:

accessing, from a database, form data that is in one or more data management file formats, updating the form data based at least in part on the accepted editing data, populating an image form document with the updated form data, the image form document being in one or more image file formats, and storing the updated form data in the database;

generating, with the populated image form document, an updated image document; and continuing to display the editing interface until an indication is received that the client device has terminated the editing;

accepting first input data via the one or more networks from the client device, the accepted first input data including at least the webpage document and the one or more webpage form documents;

accepting second input data via the one or more networks from the client device, the accepted second input data including the image document and the image form document; and generating the form data, for populating the image form document with the generated form data, and for storing the form data in the database;

wherein the image document having been created by scanning a hardcopy document and the webpage document having been based at least in part on the image document and each of the image document and the webpage document thereby having substantially similar visual content; and wherein the displaying an editing interface is configured to display the first and second portions of the editing interface as, respectively, first and second windows, side-by-side for simultaneous viewing, in which:

the first window is configured for displaying at least the webpage form document for entry of editing data for editing both the webpage document and the image document, and the second window displaying at least the image document to be edited; and wherein at least one of the displaying of the editing interface, the updating, automatically and substantially concurrently, both the webpage document and the image document, or continuing to display the editing interface is performed with a server.

13. The method of claim 12, further comprising:
Displaying the webpage document on a webpage;
providing access from the webpage to the image document;
displaying the updated webpage document on the webpage; and
providing access from the webpage to the updated image document.

14. The method of claim 12, further comprising:
accepting and storing, with the server, the image form document, the image form document having been generated based at least in part on the image document;
accepting and storing, with the server, the one or more webpage form documents; and
accepting and storing, with the server, one or more map documents, for navigating about the one or more webpage form documents when editing the webpage document.

15. The method of claim 14, further comprising generating the form data with the server and storing the form data in the database, the database being resident on at least one of the server or a separate database server.

16. The method of claim 12, wherein the webpage file format is HTML and the entry of editing data into the webpage form document displayed in the first portion of the editing interface is performed by an HTML editor that is resident on the server and accessible to the client device.

17. A non-transitory computer-readable storage media bearing computer-executable instructions that when executed causes the computer to execute a process, the process comprising:

displaying an editing interface to a client device via one or more networks, the displayed editing interface being configured for receiving editing data, via the client device, for editing both a webpage document and an image document, the webpage document being in one or more webpage file formats and the image document being in one or more image file formats, the displayed editing interface including at least a first portion and a second portion, the first portion displaying at least one or more webpage form documents, that are in one or more webpage file formats, for entering editing data, the second portion displaying at least one of the webpage document or the image document;

accepting the editing data;

updating, automatically and substantially concurrently, both the webpage document and the image document based, at least in part, on the same accepted editing data, substantially concurrently including within a window of time that is no greater than 15 seconds, wherein the updating, automatically and substantially concurrently, both the webpage document and the image document includes at least:

updating the webpage document based at least in part on the accepted editing data;

updating the image document based at least in part on the accepted editing data, the updating the image document including at least:

accessing, from a database, form data that is in one or more data management file formats, updating the form data based at least in part on the accepted editing data, populating an image form document with the updated form data, the image form document being in one or more image file formats, and storing the updated form data in the database; and generating, with the populated image form document, an updated image document; and accepting first input data via the one or more networks from the client device, the accepted first input data including at least the webpage document and the one or more webpage form documents;

accepting second input data via the one or more networks from the client device, the accepted second input data including the image document and the image form document; and generating the form data, for populating the image form document with the generated form data, and for storing the form data in the database;

wherein the image document having been created by scanning a hardcopy document and the webpage document having been based at least in part on the image document and each of the image document and the webpage document thereby having substantially similar viewable content; and wherein the displaying an editing interface is configured to display the first and second portions of the editing interface as, respectively, first and second windows, side-by-side for simultaneous viewing, in which:

the first window is configured for displaying at least the webpage form document for entry of editing data for editing both the webpage document and the image document, and the second window displaying at least the image document to be edited.

* * * * *